United States Patent [19]

Applegate et al.

[11] Patent Number: 5,255,314
[45] Date of Patent: Oct. 19, 1993

[54] SWITCH ADJUNCT INTEGRATION ARRANGEMENT

[75] Inventors: Randy L. Applegate, Westminster; Ricky L. Overmyer, Golden; Stephen R. Peck, Boulder; John B. Sharp, Denver; Nathan E. Wiscombe, Broomfield, all of Colo.

[73] Assignee: AT&T Bell Laboratories, Murray Hill, N.J.

[21] Appl. No.: 677,546

[22] Filed: Mar. 29, 1991

[51] Int. Cl.⁵ .................. H04M 3/42; H04M 1/64
[52] U.S. Cl. ........................... 379/212; 379/211; 379/201; 379/88; 379/225
[58] Field of Search ............. 379/211, 212, 201, 88, 379/89, 225, 219

[56] References Cited

U.S. PATENT DOCUMENTS

| | | | |
|---|---|---|---|
| 4,653,085 | 3/1987 | Chan et al. | 379/94 |
| 4,811,381 | 3/1989 | Woo et al. | 379/67 |
| 4,873,718 | 10/1989 | Barnett et al. | 379/156 |
| 4,878,240 | 10/1989 | Lin et al. | 379/89 |
| 4,926,462 | 5/1990 | Ladd et al. | 379/67 |
| 4,980,906 | 12/1990 | Forson et al. | 379/32 |
| 5,062,103 | 10/1991 | Davidson et al. | 370/58.1 |

OTHER PUBLICATIONS

*Voice Bridge* TM *ROLM CBX Integration*, Voice Technologies Group, Inc., product description, 6 pages.
*CCS-& 2*, Amtelco, product description (1987), 3 pages.
*DigiTrap* TM *DT-1010 DID Integration Card*, Nicollet Technologies, Inc., product description (1988), 3 pages.
*Definity® Communication System Generic 1*, Feature Description, Addendum 2, Apr. 1991, 555-200-201, Issue 6, Jun. 1990, pp. 3-121-3-135.
*AT&T System 85*, Release 2, Versions 1, 2, 3, and 4, Features Reference Manual, vol. 1—Features A–I, 555-103-301, Issue 1, Jul. 1987, pp. 23-1-23-8.
*AT&T Systems 85*, Release 2, Versions 1, 2, 3, and 4, Features Reference Manual, Addendum 1, 555-10-3-301, Issue 1, Addendum 1, Feb. 1988, pp. E-1-E-5.

*Primary Examiner*—James L. Dwyer
*Assistant Examiner*—Fan Tsang
*Attorney, Agent, or Firm*—David Volejnicek

[57] ABSTRACT

A switch-adjunct integration device uses multiple line appearances of one or more digital telephone lines to gather information on calls destined for an adjunct voice-mail system, to transfer the calls to analog phone lines leading to the voice-mail system, and to detect call completions. Call completion is detected by bridging some of the line appearances to the analog phone lines and monitoring the bridged line appearances for call status reported thereon by the switch. Call-related information, including call completion, is reported from the integration device to the voice mail system over a control link. The analog phone lines are connected to the voice mail system through switch relays on the integration device. The integration device momentarily opens a relay when it detects call completion on the connected analog line to further enhance call-completion signaling.

26 Claims, 18 Drawing Sheets

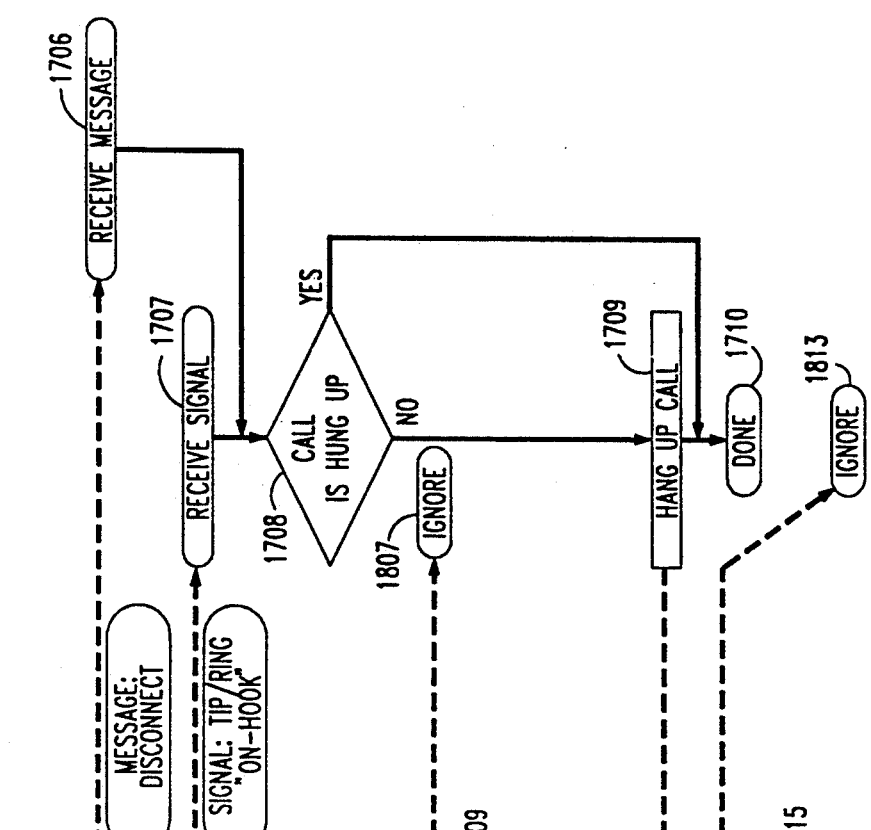
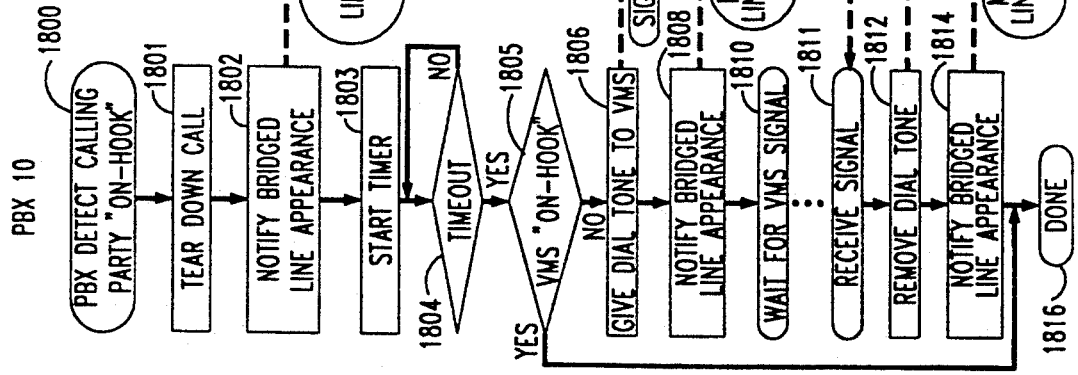
FIG. 18

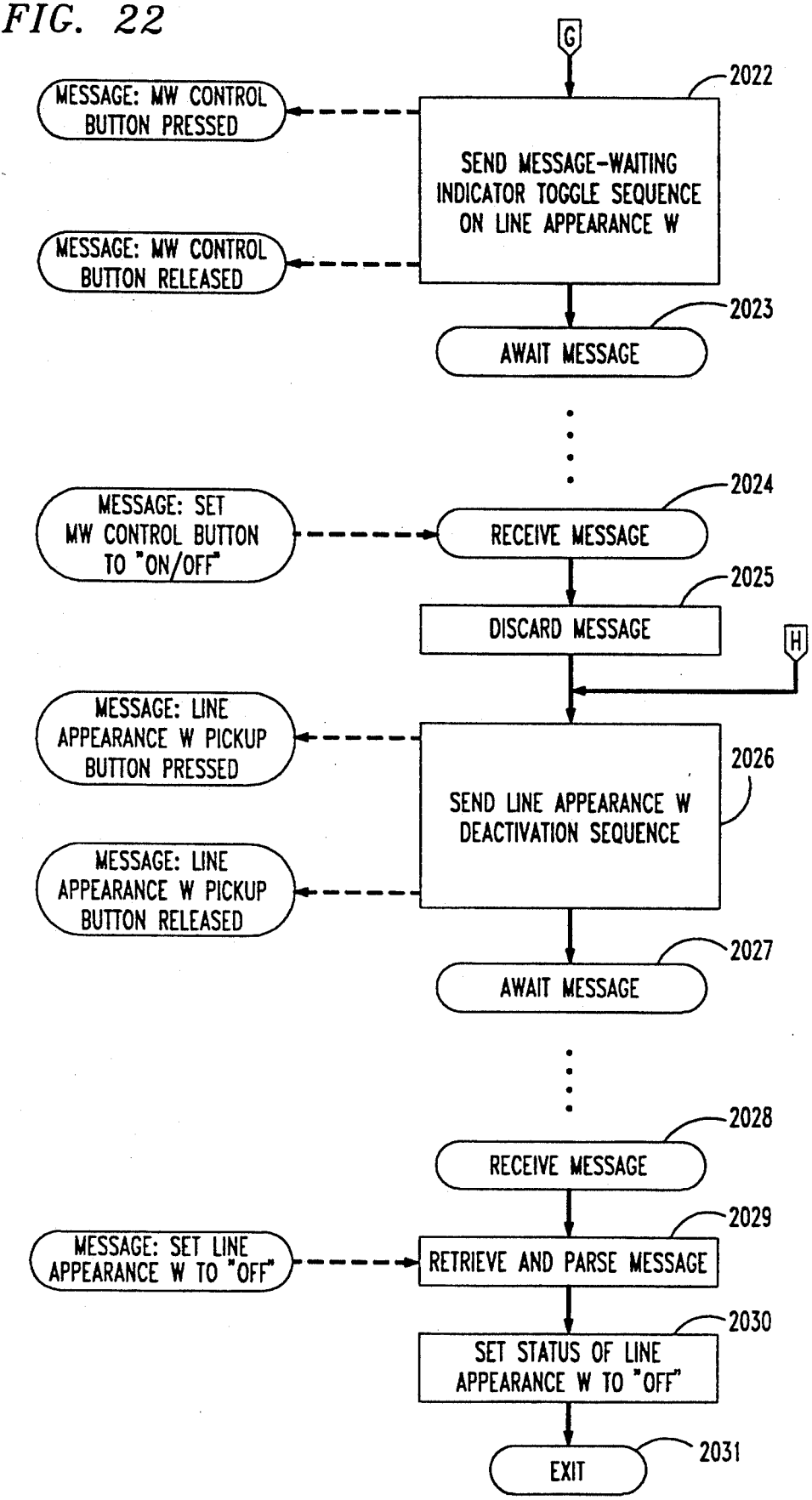

SWITCH ADJUNCT INTEGRATION ARRANGEMENT

TECHNICAL FIELD

The invention relates to interfacing and integration of disparate telecommunication equipment into a telecommunications system.

BACKGROUND OF THE INVENTION

It is known to use adjunct processors in conjunction with switching systems in order to supplement and enhance the telecommunications services provided by the switching systems. For example, an AT&T AUDIX voice mail system is often used with an AT&T Definity ® PBX to provide users with voice messaging capabilities. In order to work together, the switching system and the adjunct processor must be able to communicate with each other. This is commonly accomplished through a singular digital control data link that interconnects the switching system control processor with the adjunct processor. An example of such a link is the AT&T DCIU link. As with the DCIU link, many vendors' switching systems use proprietary communications protocols on the singular digital control data link, thereby making it extremely difficult or even impossible to use other vendors' adjunct processors with their switching systems.

Various arrangements have been proposed to overcome this difficulty and to facilitate integration of different vendors' switching systems and adjunct processors. These proposals commonly rely on ignoring the singular digital control data communication link and its protocol, and obtaining the required communication capability by other means, through alternative connections to the switching system. A representative arrangement of this type is disclosed in U.S. Pat. No. 4,873,718. It discloses a device for integrating one vendor's adjunct voice mail system with another vendor's PBX. The integration device is the other vendor's feature telephone set equipped with additional circuitry which monitors the display, indicators, and function keys of the feature telephone set. The voice mail system is connected to a set of analog telephone lines of the PBX, and to the monitoring circuit. The telephone set is connected to a digital telephone line of the PBX, which line's protocol it naturally understands. Operation of the integration device is, in part, as follows. When an incoming call is to be handled by the voice mail system, the PBX first connects the call to the telephone set. In response, the monitoring circuit identifies—via inspection of an I/O device, i.e., an LCD display—and reserves a free line appearance on the telephone set. The telephone set answers the call and obtains requisite information about it from the PBX, over the digital telephone line which connects them. This information is captured by the monitoring circuit. The monitoring circuit then causes the telephone set to command the PBX to "park" the call on the free appearance that it had identified, and also passes the captured call information on to the voice mail system, including the phone number of the appearance where the call is parked. The voice mail system then selects a free analog telephone line and dials a connect feature code to access the parked call, and the involvement of the integration device in handling the call ceases.

A disadvantage of this approach is that, in having to interface to the feature telephone set as that set's display, indicators, and function keys do, it requires numerous wire connections to the feature telephone set, which potentially adversely affects its reliability. Another possible disadvantage is that it requires a feature telephone set, which may unduly add to the cost of the integration device relative to a custom implementation. A further disadvantage of this approach is that, by merely parking a call by action of the integration device, it requires the voice message system to take an active part in establishing a connection to the parked call. This is functionality which is not commonly found in voice mail systems, and hence requires that the voice mail system be modified before it can be integrated to a PBX by means of this approach.

Another disadvantage is that the aforementioned implementation of the integration device is not involved in handling the call during the call and at call completion, and therefore the voice mail system must rely on its own capabilities to detect call status such as call completion. Some PBXs provide a current level fluctuation on an analog telephone line to signal that the party on the other end of the call has hung up, and this fluctuation may be detected by the voice mail system. But other PBXs do not provide this signal, causing the voice mail system, or an adjunct thereto, to rely on return of dial tone by the PBX as an indication that the call has been completed. Detection of dial tone conventionally requires the use of additional circuitry, either as part of the voice mail system itself or as part of an adjunct device to the voice mail system. Furthermore, return of dial tone is typically delayed for some seconds after call completion, during which time the voice mail system treats the call as ongoing. This results in inefficiency, waste of voice mail system and PBX resources, and annoyance to the call message recipient if this silent portion of the message is not deleted or if the subsequent dial tone is recorded as part of the message.

SUMMARY OF THE INVENTION

This invention is directed to overcoming these and other disadvantages of the prior art. According to the invention, there is provided a switch-adjunct integration arrangement which uses bridged line appearances to determine call status, including call completion, of calls extending between the switch and the adjunct. It then communicates the determined call status to the adjunct (e.g., a voice mail system). The integration arrangement connects to one or more first digital telecommunications lines of the switch, each one of which has a plurality of line appearances. A different one of the line appearances is bridged to each second telecommunications line that connects the switch with the adjunct. When a communication signifying completion of a call is received on a first line by the integration arrangement for a bridged individual one of the line appearances, the integration arrangement responds thereto by communicating to the adjunct that a call has been completed on the second line to which the individual one of the line appearances is bridged. Illustratively, this latter communication takes the form of an analog signal transmitted by the integration arrangement on the second line to which the individual one of the line appearances is bridged, or of a control communication transmitted on a control link that interconnects the integration arrangement with the adjunct, or both. The integration device thus effectively provides the adjunct with call termination information.

The integration arrangement also uses the line appearances of the first lines to obtain call-related information needed by the adjunct about calls destined to be extended between the switch and the adjunct, such as identifiers of the calling and/or called parties. It then communicates the obtained call-related information to the adjunct. Calls that are destined (directly or indirectly) for the adjunct are initially connected to the first lines. When a communication signifying connection of a call to one of the first lines and conveying call-related information for the call is received on a first line by the integration arrangement for a non-bridged one of the line appearances, the integration arrangement responds thereto by causing the call to be transferred to one of the second lines and by communicating to the adjunct the call-related information, preferably accompanied by information identifying the second line to which it caused the call to be transferred. Illustratively, the integration arrangement effects the transfer by means of communications which it sends on the first line to the switch for the non-bridged one of the line appearances. The communication of the call-related information to the adjunct illustratively takes the form of control messages transmitted on a control link that interconnects the integration arrangement with the adjunct. The integration arrangement is thus able to obtain for the adjunct the call-related information required by the adjunct for effective integration of the switch and adjunct to be possible. Also, this information can be conveyed using an industry-standard protocol, such as SMSI, making it possible for multiple vendors to use this same arrangement.

These and other advantages and features of the invention will become apparent from the following description of an illustrative embodiment of the invention taken together with the drawing.

BRIEF DESCRIPTION OF THE DRAWING

FIGS. 17-19 are flow diagrams of different call-completion scenarios of the system of FIG. 1 making use of the routine of FIG. 16; and FIGS. 20-22 are a flow diagram of a message-waiting update procedure of the SAIL of FIG. 1.

DETAILED DESCRIPTION

Figure 1:
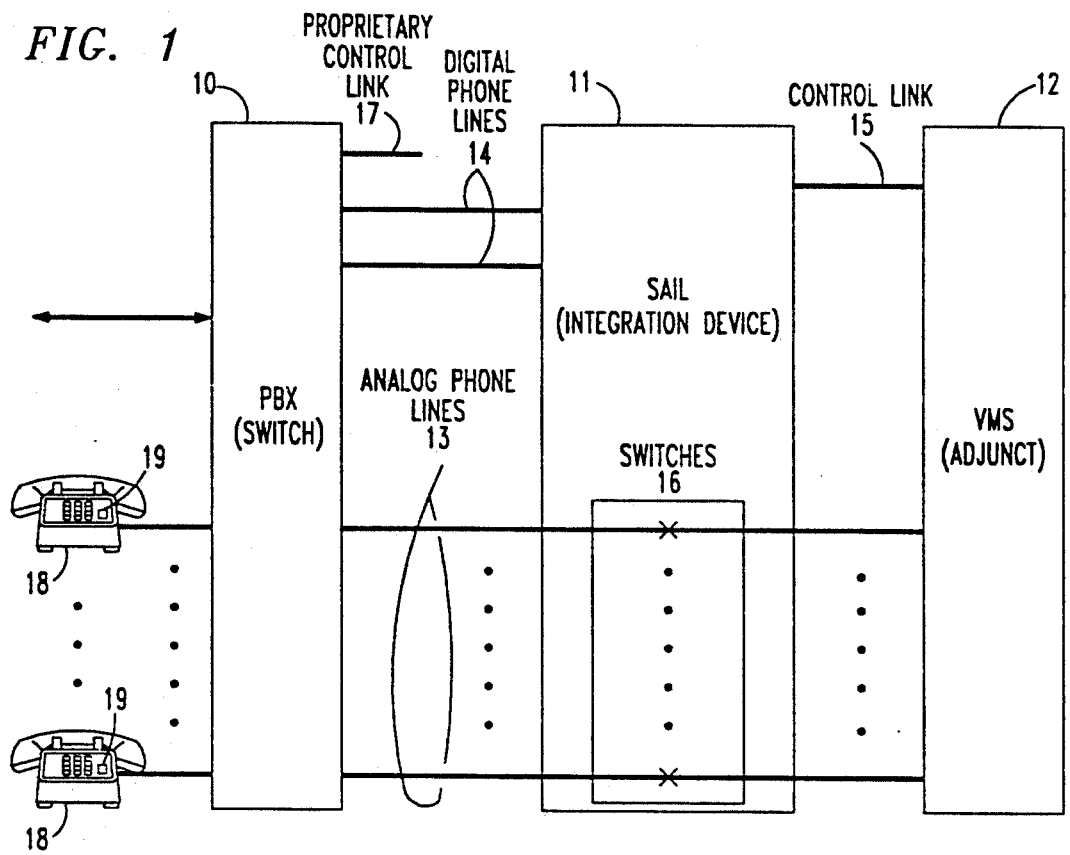
FIG. 1 is a block diagram of a telecommunication system that includes an illustrative embodiment of the invention.

FIG. 1 shows an illustrative telecommunications system that makes use of the invention to integrate a telecommunications switching system with an adjunct processor. The switching system, or switch for short, is illustratively a private branch exchange (PBX) 10 of one vendor—the Rolm ® 9751 in this example—while the adjunct processor, or adjunct for short, is illustratively a voice mail system (VMS) 12 of another vendor—the AT&T Audix in this example. As is conventional, VMS 12 allows callers to leave voice-mail messages for telecommunications services subscribers who are served by PBX 10 and connected telephone terminals 18.

PBX 10 has a digital control data communications link 17 which it normally uses to interface with adjuncts that understand the proprietary protocol which is used on link 17. However, VMS 12 does not understand the communications protocol used on link 17. Consequently, link 17 is useless in this instance, and is not connected to VMS 12. Instead, an integration device, referred to herein as a switch-adjunct integration link (SAIL) 11, interfaces PBX 10 with VMS 12. PBX 10 is connected to SAIL 11 by one or more—two in this example—conventional digital telephone lines 14, which are terminated on SAIL 11. In this example, communications proceed across each line 14 using the ROLMLINK TM communications protocol. SAIL 11 is connected to VMS 12 by a control link 15. Communications proceed across link 15 using any suitable protocol that is understood by VMS 12—illustratively the SMSI protocol substantially enhanced as described in U.S. Pat. No. 4,980,906. Illustratively, PBX 10 is connected to VMS 12 through SAIL 11 by a set—thirty two in this example—of conventional analog telephone lines 13. Lines 13 are routed through switch relays (on-off switches) 16 located within SAIL 11. Otherwise, information conveyable by SAIL 11 across lines 13 may be conveyed via control link 15, and lines 13 may connect PBX 10 and VMS 12 directly.

At a very high level, the interaction of SAIL 11 with PBX 10 and VMS 12 is as follows. SAIL 11 uses lines 14 to connect to calls that are to be handled by VMS 12, to obtain from PBX 10 information about those calls, and to transfer the calls to lines 13. The calls thus become connected to VMS 12 over lines 13, and SAIL 11 sends the information that it collected about those calls to VMS 12 over link 15. Importantly, SAIL 11 also uses lines 14 to detect completion of the calls on lines 13, and signals that completion to VMS 12 over both lines 13 and link 15. This will be explained further below.

Figure 2:
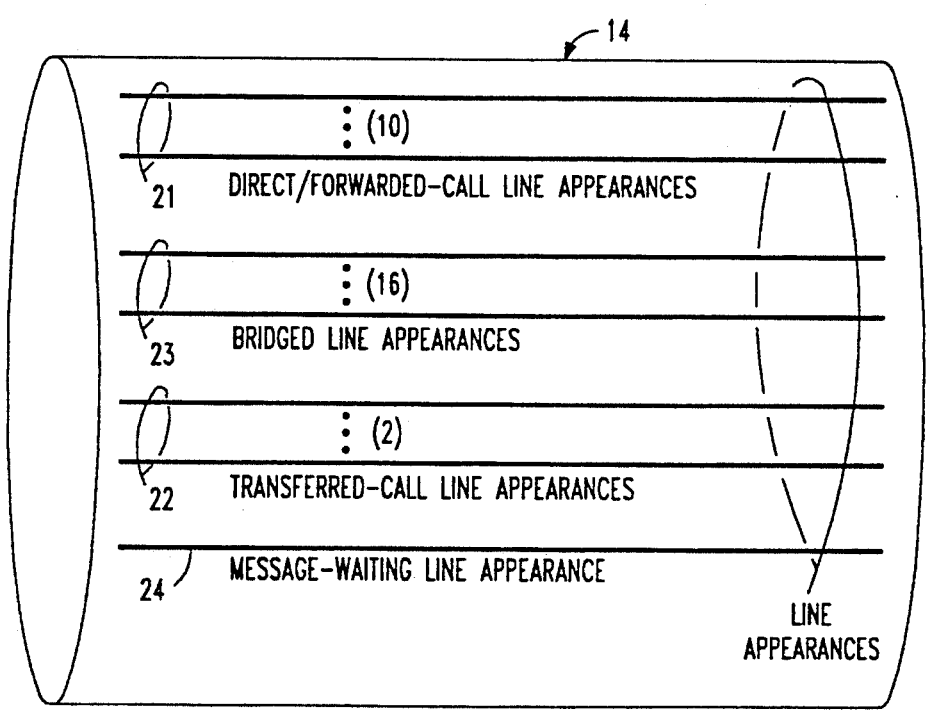
FIG. 2 is a diagram of multiple line appearances of a digital phone line of FIG. 1.

From the viewpoint of PBX 10 and SAIL 11, each line 14 has multiple—twenty nine in this example—line appearances 21-24, as shown in FIG. 2. Multiple line appearances are well known and understood within the art. Each line appearance in groups 21-24 is effectively a separate logical channel defined by the single physical channel, the line 14. The multiple line appearances are created and defined by administering PBX 10 in a known manner. The multiple line appearances are divided into a plurality of functional groups, also by administering PBX 10. Illustratively, in this example, PBX 10 is administered with respect to each line 14 as it would be if a Rohm ® 400 station set with a display module were connected to each line 14. A group of line appearances 21—ten in this example—is used for handling calls that either are being forwarded (redirected without having been answered) or are being directly connected (including calls by customers to retrieve stored messages) to VMS 12. A group of line appearances 22—two in this example—is used for handling calls that are being transferred (redirected after having been answered) to VMS 12. A group of line appearances 23—sixteen in this example—is bridged, in a 1-to-1 correspondence, to a group of lines 13 to enable integration device 11 to monitor the status of the lines 13. The bridging of telephone lines and line appearances is well known in the art. It is also achieved through administering PBX 10 in a well known manner. And a group of line appearances 24—one of them in this example—is used by SAIL 11 to control message-waiting lamps 19 of telephone terminals 18 (see FIG. 1) of the intended recipients of messages stored by VMS 12. Groups of line appearances 21 of the two lines 14 together form either a hunt or a distribution group, as do the two groups of line appearances 22.

Figure 3:
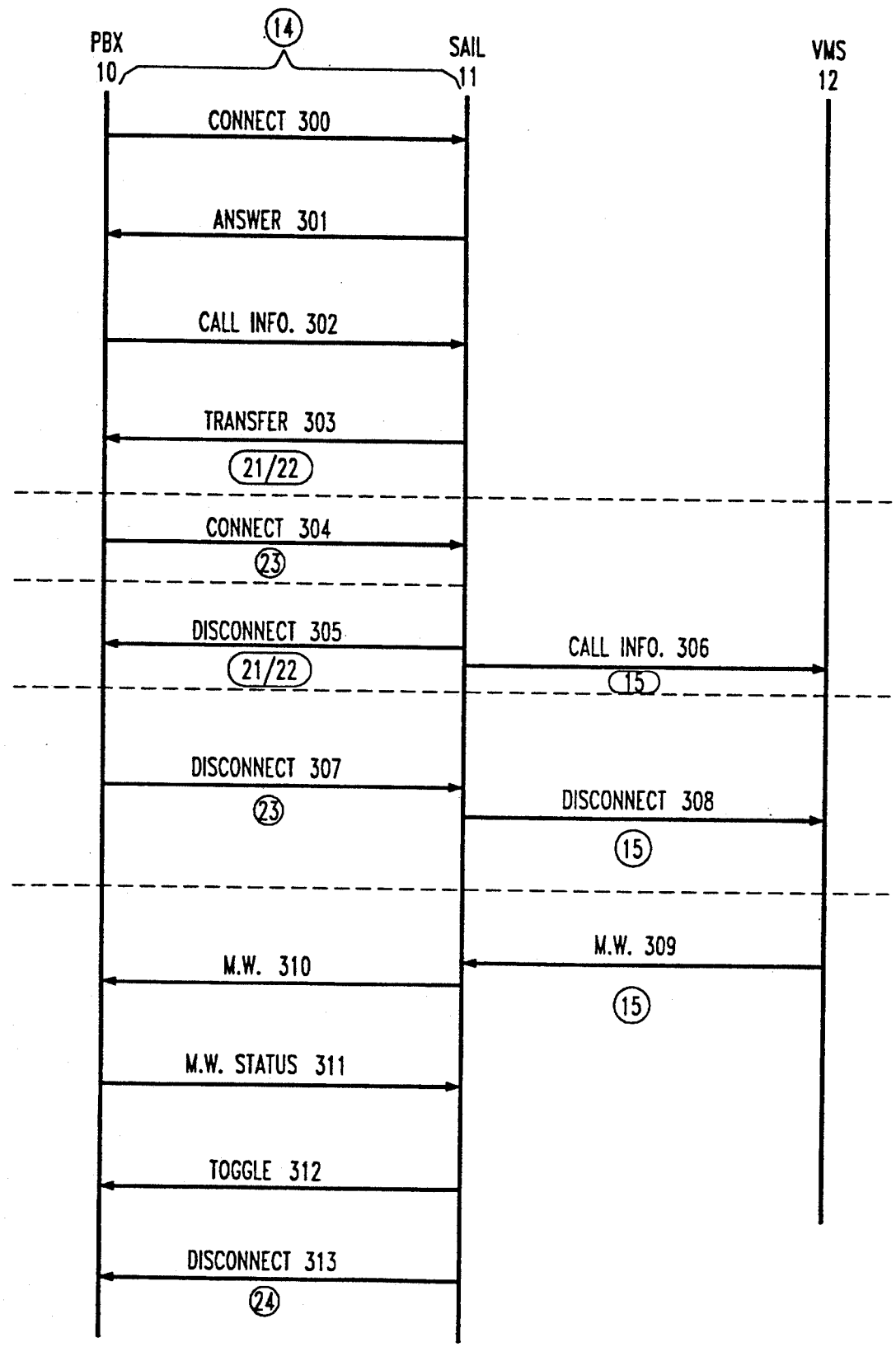
FIG. 3 is a functional diagram of communications exchanged by the switch-adjunct integration link (SAIL) of FIG. 1 with the PBX and the VMS of FIG. 1.

The interactions of SAIL 11 with PBX 10 and VMS 12 are diagrammed in FIG. 3. (Other interactions may proceed between PBX 10 and VMS 12 directly across lines 13.) This diagram shows the functionality of communications exchanged between devices 10–12. It will be understood by those skilled in the art that the particular types and numbers of messages that correspond to this functionality in any actual implementation will depend upon the particular communications protocols that are used on lines 14 and link 15.

When a call is being sent to VMS 12, PBX 10 connects the call to a selected idle one of line appearances 21 or 22 (depending on whether the call is directly dialed, forwarded, or transferred to VMS 12), and announces that call to SAIL 11 by sending via a logical channel on line 14 a "connect" message 300 for the selected line appearance 21 or 22 (hereinafter referred to as sending on the selected line appearance). When SAIL 11 is ready to handle the call, it sends an "answer" message 301 on the selected line appearance 21 or 22 to PBX 10. PBX 10 responds by sending a "call info." message 302 on the selected line appearance 21 or 22 to SAIL 11. The "call info." message 302 contains information about the call that PBX 10 has been able to gather: whether the call is directly dialed or forwarded to VMS 12; if forwarded, whether on account of the called party being busy or not answering; the calling party I.D., if available; and the called party I.D., if available. (As a consequence of the peculiarities of operation of the ROLM 9751 PBX, in the case of a transferred call, the transferring party may be incorrectly identified in message 302 as the calling party; to alert SAIL 11 to this possibility is the reason why transferred calls are connected to a different hunt group of line appearances 22 than other calls.) SAIL 11 stores the contents of "call info." message 302.

SAIL 11 knows the busy/idle status of analog lines 13 from lamp status messages received from PBX 10 over bridged line appearances 23. Prior to answering, it will have selected an idle one of lines 13, and now sends a "transfer" message 303 on the subject line appearance 21 or 22 referred to above, commanding PBX 10 to transfer the call to the selected line 13. SAIL 11 then monitors the line appearance 23 that is bridged to the selected line 13, for receipt of a message 304 that indicates that the call has been connected to the selected line 13. Message 304 is illustratively a command to turn on any indicator light associated with the selected line 13. If SAIL 11 does not receive message 304 within a predetermined time period, it assumes failure of the transfer, and therefore returns to previously-described steps to select another idle line 13, send a new "transfer" message 303, and monitor the line appearance 23 that is bridged to this new line 13 for receipt of a message 304.

Upon receipt of message 304, SAIL 11 sends a "disconnect" message 305 to PBX 10 on the subject line appearance 21 or 22, to free up that line appearance 21 or 22 for receipt of another call. SAIL 11 then sends a "call info." message 306 to VMS 12 over link 15. Message 306 contains information about the call that was conveyed to SAIL 11 from PBX 10 by "call info." message 302, plus the I.D. of the selected analog line 13 to which the call is now connected.

When PBX 10 detects that either end of the call has terminated the call (i.e. "hung up") and the call has thus been disconnected from the selected line 13, PBX 10 sends a "disconnect" message 307 that indicates this condition on the line appearance 23 which is bridged to the selected line 13. Illustratively, if VMS 12 terminated the call, the message 307 sent by PBX 10 is a command to turn off any indicator light associated with the bridged-to line 13. Also illustratively, if the remote end—the calling party—terminated the call, the message 307 sent by PBX 10 is either a command to turn on any indicator light associated with the bridged-to line 13, or a pair of commands, in quick succession, to turn off and to turn on again any indicator light associated with the bridged-to line 13.

SAIL 11 monitors the status of the call on the selected line 13 by means of the line appearance 23 that is bridged to the selected line 13. Upon receipt of message 307, SAIL 11 momentarily opens the one of switches 16 which is connected to the bridged-to line 13, thereby causing a call disconnect at VMS 12, and also sends a "disconnect" message 308 identifying that line 13 to VMS 12 over link 15. Both actions signal to VMS 12 that the call has been terminated.

When VMS 12 wishes to turn on or off the message-waiting indicator 19 of a message recipient's phone terminal 18 (see FIG. 1), it sends a "message-waiting" (M.W.) message 309 to SAIL 11 over link 15. SAIL 11 responds by sending a "M.W." message 310 to PBX 10 over a selected line appearance 24. PBX 10 responds to message 310 by performing the desired action, and returns a "M.W. status" message 311 over the selected line appearance 24 to apprise SAIL 11 of the on/off status of the message-waiting indicator 19. If SAIL 11 finds that indicator 19 status is incorrect, it sends a "toggle" message 312 over the selected line appearance 24 to PBX 10 to cause it to change the status. After either receiving "M.W. status" message 311 or sending "toggle" message 312, SAIL 11 sends a "disconnect" message 313 over the selected line appearance 24 to PBX 10 to indicate the end of the message waiting update operation.

Figure 4:
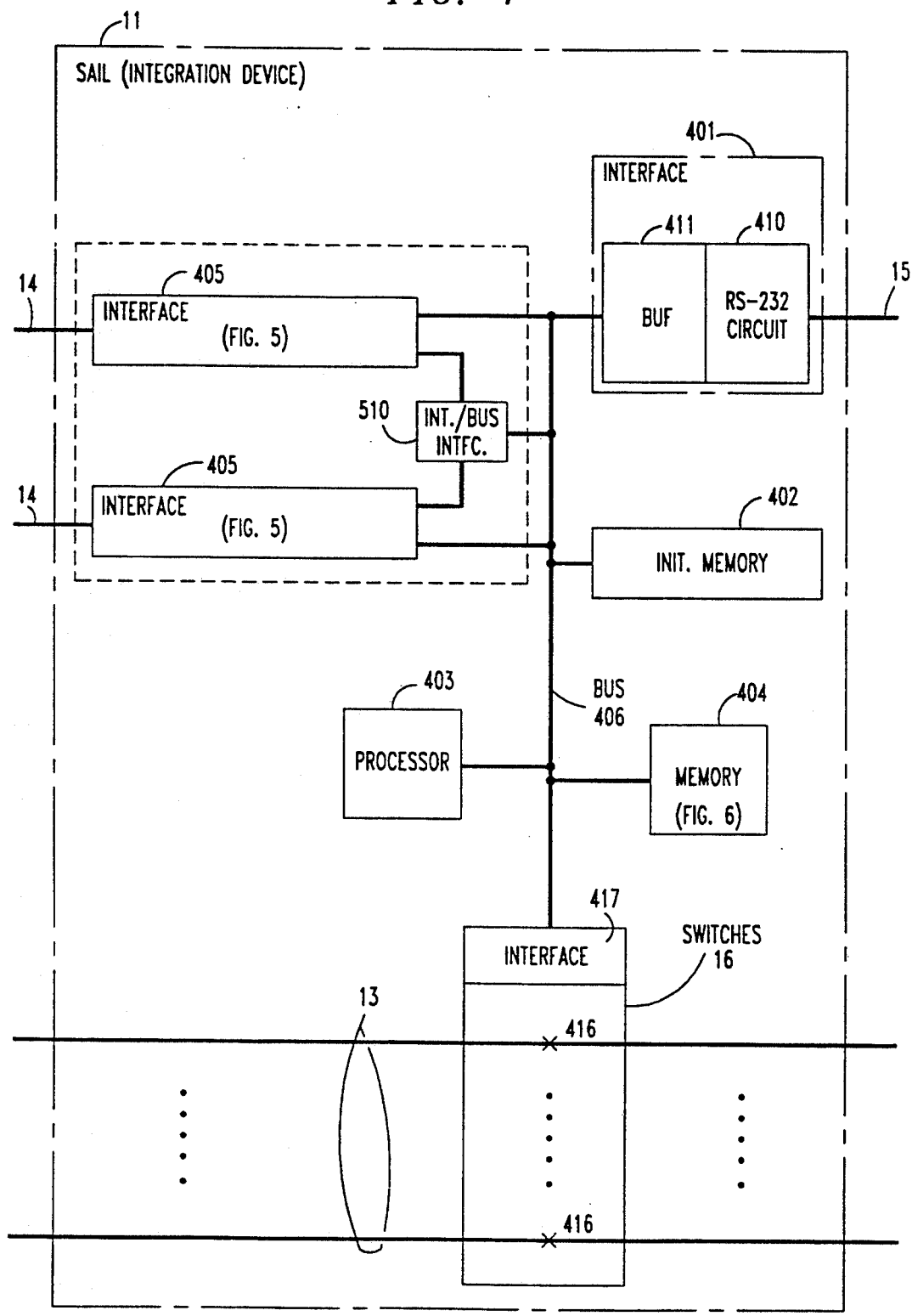
FIG. 4 is a block diagram of the SAIL of FIG. 1.

Having described the interaction of elements 10–12, attention is now turned to the internal structure and functionality of SAIL 11. A block diagram of SAIL 11 is shown in FIG. 4. SAIL 11 includes a pair of interfaces 405, one coupled to each line 14, for terminating lines 14 and their protocol, and an interface 401 coupled to link 15 for terminating link 15 and its protocol. Interfaces 405 and 401 are connected by a bus 406 to a processor 403, which is the intelligence of SAIL 11 and communicates through interfaces 405 and 401 with PBX 10 and VMS 12 on behalf of SAIL 11. Processor 403 also controls the opening and closing of individual switches 416 of switches 16, through a switch interface 417 to which it is connected by bus 406. Processor 403 has its own random access working memory 404 to which it is connected by bus 406. Processor 403 is also connected by bus 406 to an initialization memory 402 which provides initialization data and programs for the initialization of processor 403 and memory 404. Memory 402 illustratively comprises a floppy disk drive and ROMs.

Elements 402, 404, 406, and 416–417 individually are elements of conventional design and operate in a conventional manner. Processor 403 is a conventional commercial microprocessor, programmed to operate as shown in FIGS. 7–16 and 20–22. Interface 401 includes a conventional RS-232 link circuit 410 which is coupled to bus 406 through a buffer circuit 411. Buffer circuit 411 receives and stores messages for link 15 from processor 403 and vice versa, notifies the intended message recipient (either processor 403 or circuit 410) by interrupt of arrival of a message, and permits retrieval of messages by the intended message recipient on a first-in, first-out basis.

Figure 5:
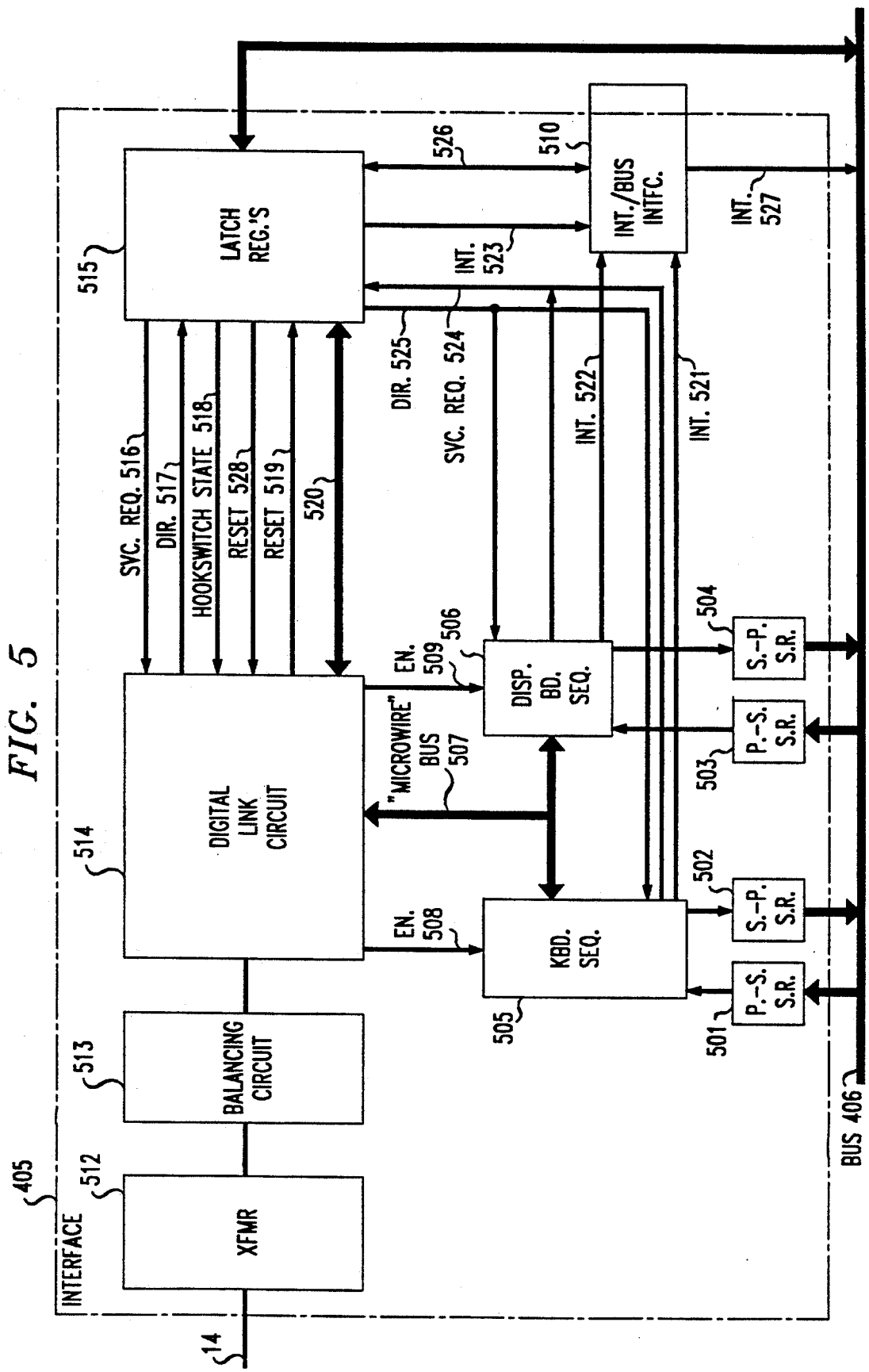
FIG. 5 is a block diagram of a line interface of FIG. 4.

Interfaces 405 are identical; one is shown in FIG. 5. Each interface 405 includes devices 512–514 which couple messages to and from line 14. A transformer 512 electrically couples interface 405 to line 14. Transformer 512 is, in this example, any one of the device numbers 505729-01 or 57C2901 of Rolm Corporation. A balancing circuit 513 performs the conventional function of a hybrid circuit: it overlays, or superimposes, the outgoing message signal stream onto the incoming message signal stream to achieve full-duplex transmission on lines 14 while keeping the two signal streams separated internally to SAIL 11. Circuit 513 is, in this example, any one of the device numbers 509613-01 or 96C1301 of Rolm Corporation. Finally, a digital link circuit 514 performs conventional multiplexing and demultiplexing functions: it demultiplexes message frames incoming through circuit 413 from line 14 into logically distinct messages and functional signals which it passes on to other circuits of interface 405, and multiplexes logically distinct messages and functional signals incoming from other circuits of interface 405 into message frames for transmission on line 14. Thus the line appearances 21–24 for a line 14 are established. Circuit 514 is, in this example, any one of the device nos. 505869-03, 96D3370, or 74D9301 of Rohm Corporation. Which devices are used in a particular implementation as devices 512–514 is a function of the type and characteristics of the line 14 to which they are connected. In this example, Rohm devices were used because line 14 is assumed to be a Rolm digital phone line. A different but similar implementation would be used if line 14 were, for example, a Northern Telecom digital phone line.

Digital link circuit 514 is connected to a keyboard sequencer (KBD.SEQ.) 505 and to a display board sequencer (DISP.BD.SEQ) 506 by a "Microwire" bus 507 and a pair of enable (EN) leads 508 and 509, one for each sequencer 505 and 506, respectively. Bus 507 implements the conventional "Microwire" serial communications protocol of National Semiconductor Corp. Sequencers 505 and 506 terminate that protocol, receiving data in the form of "Microwire" protocol messages from circuit 514 via bus 507 and sending data in the form of "Microwire" protocol messages to circuit 514 via bus 507. Such sequencers are known in the art. Enable leads 508 and 509 are used by circuit 514 to specify the intended recipient among sequencers 505 and 506 of messages sent on bus 507 by circuit 514.

Sequencers 505 and 506 are in turn interfaced to bus 406 by shift registers (S.R.) 501–504. Parallel-to-serial (P.-S.) shift registers 501 and 503 accept bytes of data in bit-parallel form from bus 406, latch them, and convert them into bit-serial form for input to sequencers 505 and 506, respectively. Serial-to-parallel (S.-P) shift registers 502 and 504 accept bytes of data in bit-serial form from sequencers 505 and 506, respectively, store them, and output them in bit-parallel form to bus 406 to be accessible to processor 403. Such shift registers are well known in the art.

Digital link circuit 514 is further connected by a plurality of leads 516–520 to a set of latch registers 515. Latch registers are well known in the art. Latch registers 515 latch signals output onto leads 516–520 by circuit 514 and allow the latched signals to be read by other elements of interface 405. Latch registers 515 also output onto leads 516–520 signals that have been written into registers 515 by other elements of interface 405. For purposes of this application, four of the leads 516–520 are significant. Service request (SVC.REQ.) lead 516 is used to indicate to circuit 514 that a sequencer 505 or 506 has data to communicate to circuit 514. The state of lead 516 is controlled by sequencers 505 and 506 through registers 515 via a SVC.REQ. control lead 524. Direction (DIR.) lead 517 is used by circuit 514 to indicate the direction—to or from circuit 514—in which communications are presently allowed on bus 507. The state of lead 517 is determined by digital link circuit 514 and is communicated to sequencers 505 and 506 through registers 515 via a DIR. control lead 525. Hookswitch state lead 518 is used to send "on-hook" and "off-hook" signals to circuit 514. Reset lead 528 is used to reset circuit 514. The state of leads 518 and 528 is controlled by processor 403 through registers 515 via bus 406. And reset lead 519 is used by digital link circuit 514, when circuit 514 is initialized by PBX 10, to reset interface 405 and memory 404 contents associated with that interface 405. The remaining leads 520 are not important for purposes of this discussion. They are used, for example, for maintenance purposes, such as to receive and answer queries from PBX 10 about continued proper operation of SAIL 11.

Communications between interfaces 405 and processor 403 are interrupt-driven. For this purpose, interfaces 405 include interrupt logic 510, whose use they share. Interrupt logic 510 is of conventional design. It collects interrupt signals from sequencers 505 and 506 and latch registers 515 via interrupt (INT.) leads 521, 522, and 523, respectively, stores information pertaining to the interrupts (e.g. identification of the element that issued the interrupt) in latch registers 515, via a link 526, and then issues an interrupt signal to processor 403 via an interrupt (INT.) lead 527 of bus 406.

In response to receiving the interrupt, processor 403 accesses latch registers 515 of interfaces 405 via bus 406 and reads the information stored therein by interrupt logic 510 to determine the meaning of the received interrupt. This information allows processor 403 to determine, for example, which of the two interfaces 405 originated the interrupt, which of the two sequencers 505 and 506 of an interface 405 originated the interrupt, and whether the interrupt indicates that a shift register 501 or 503 has been emptied of data by a sequencer or that a shift register 502 or 504 has been filled with data by a sequencer.

Figure 6:
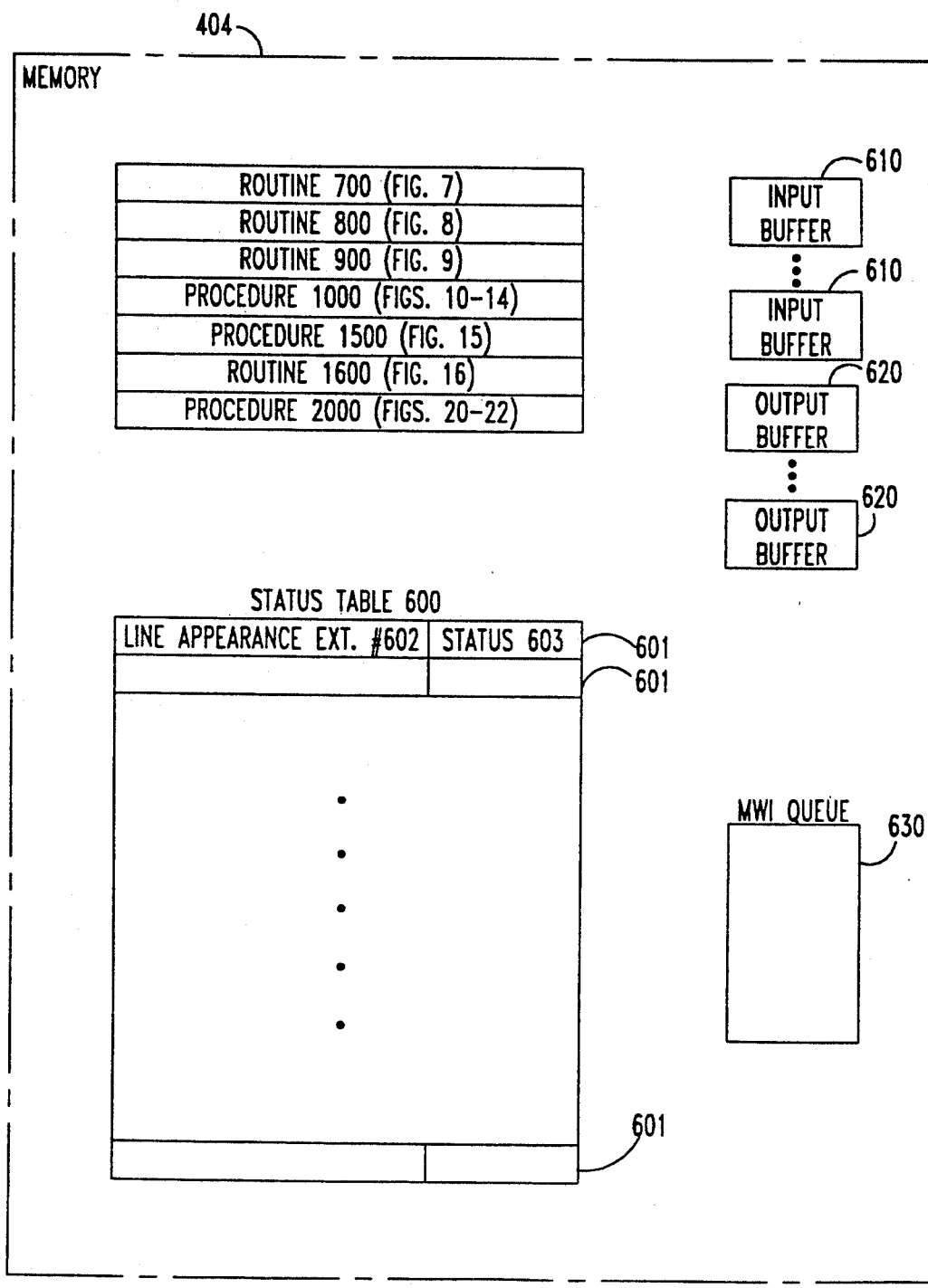
FIG. 6 is a block diagram of contents of the memory of FIG. 4.

FIG. 6 shows memory 404 structures and contents that are relevant to the disclosed invention. Memory 404 stores a status table 600 by means of which processor 403 keeps track of the status of line appearances of lines 14 and of virtual entities (e.g., virtual indicator LED's) associated with those line appearances. Table 600 has a plurality of entries 601, one for each line appearance of each line 14. Each entry has two fields: a field 602 which stores the extension number that is associated with the corresponding line appearance 21-24, and a field 603 which stores the status information for the corresponding line appearance.

Memory 404 also stores program entities 700, 800, 900, 1000, 1500, 1600, and 2000, which are executed by processor 403 to implement the functionality of SAIL 11. For their use, memory 404 includes a plurality of input buffers 610, output buffers 620, and a queue 630.

Figure 7:
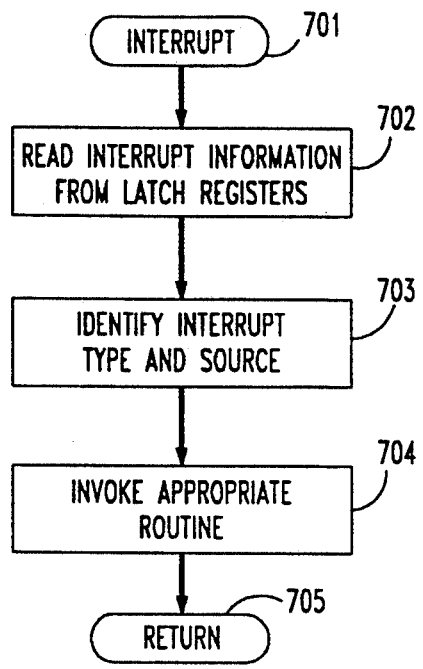
FIG. 7 is a flow diagram of an interrupt routine of the SAIL of FIG. 1.

Routine 700 is the interrupt-handler routine. It is shown in FIG. 7. Execution of routine 700 is triggered by receipt of an interrupt by processor 403, at step 701. In response, routine 700 causes interrupt information to be retrieved from latch registers 515 of interfaces 405, at step 701. Routine 700 examines the retrieved information to identify the cause—the type and the source—of the interrupt, at step 703. Routine 700 then invokes execution of another one of the program entities—one that is appropriate for the given interrupt—at step 704, and then returns to the point of its invocation, at step 705.

Figure 8:
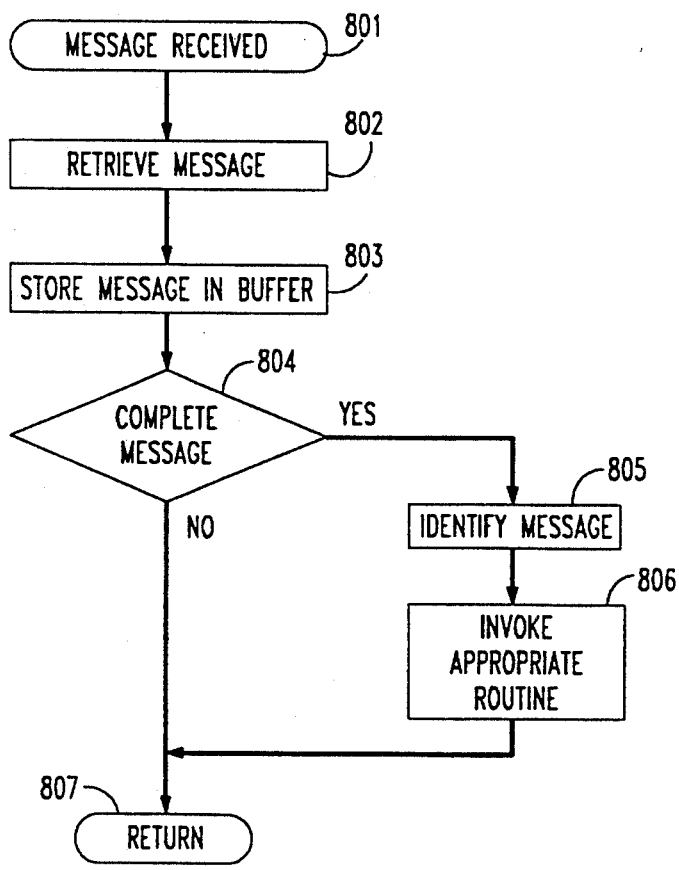
FIG. 8 is a flow diagram of a message-received routine of the SAIL of FIG. 1.

If analysis of the retrieved interrupt information at step 703 indicates that a message was received by sequencer 505 or 506 from circuit 514, routine 700 invokes routine 800 at step 704. Routine 800 is shown in FIG. 8. As part of its invocation, at step 801, routine 800 receives information on which shift register 502 or 504 of which interface 405 is the repository of the received message. Routine 800 uses this information to retrieve the message, at step 802. Routine 800 then stores the retrieved message in an input buffer 610 in memory 404, at step 803. Routine 800 then checks the information stored in that buffer 610, at step 804, to determine if a complete message is stored therein. If not, routine 800 returns, at step 807, to await receipt of the remainder of the message; if so, routine 800 identifies the message, at step 805, and based on its identity invokes execution of another program entity that is appropriate for that message, at step 806, before returning at step 807.

Figure 9:
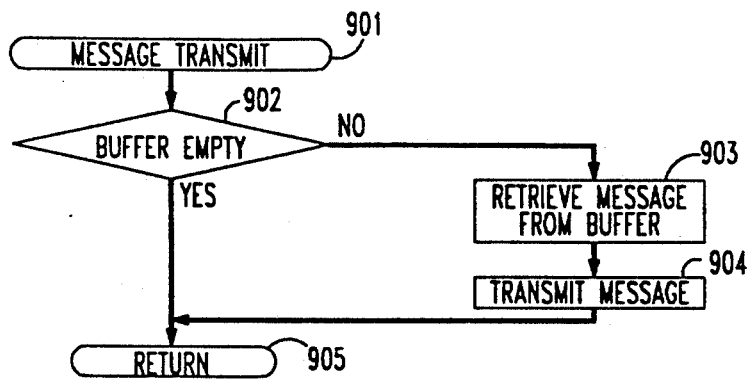
FIG. 9 is a flow diagram of a message-transmit routine of the SAIL of FIG. 1.
Figure 10:
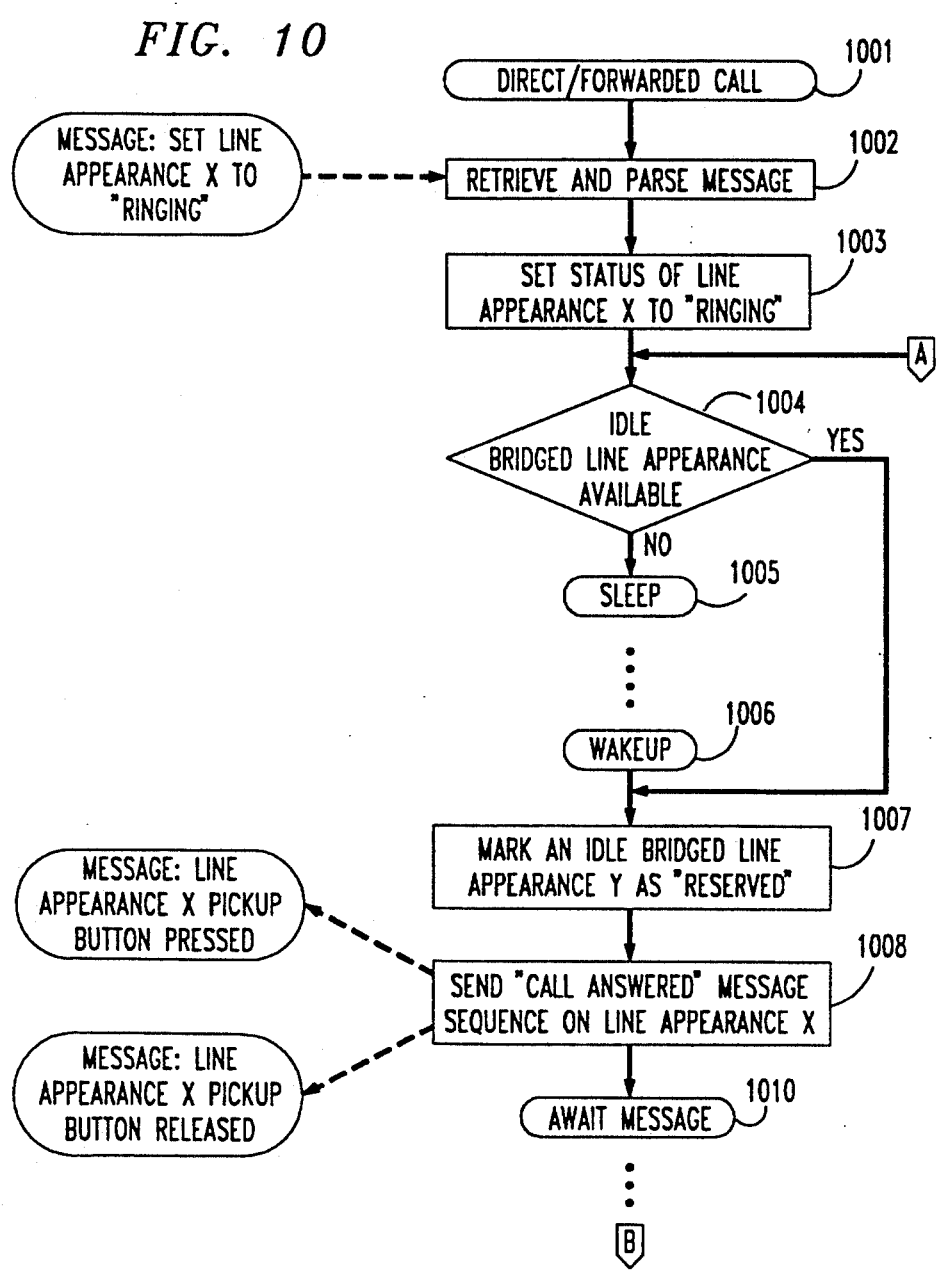
FIGS. 10-14 are a flow diagram of a direct/forwarded-call processing procedure of the SAIL of FIG. 1.
Figure 11:
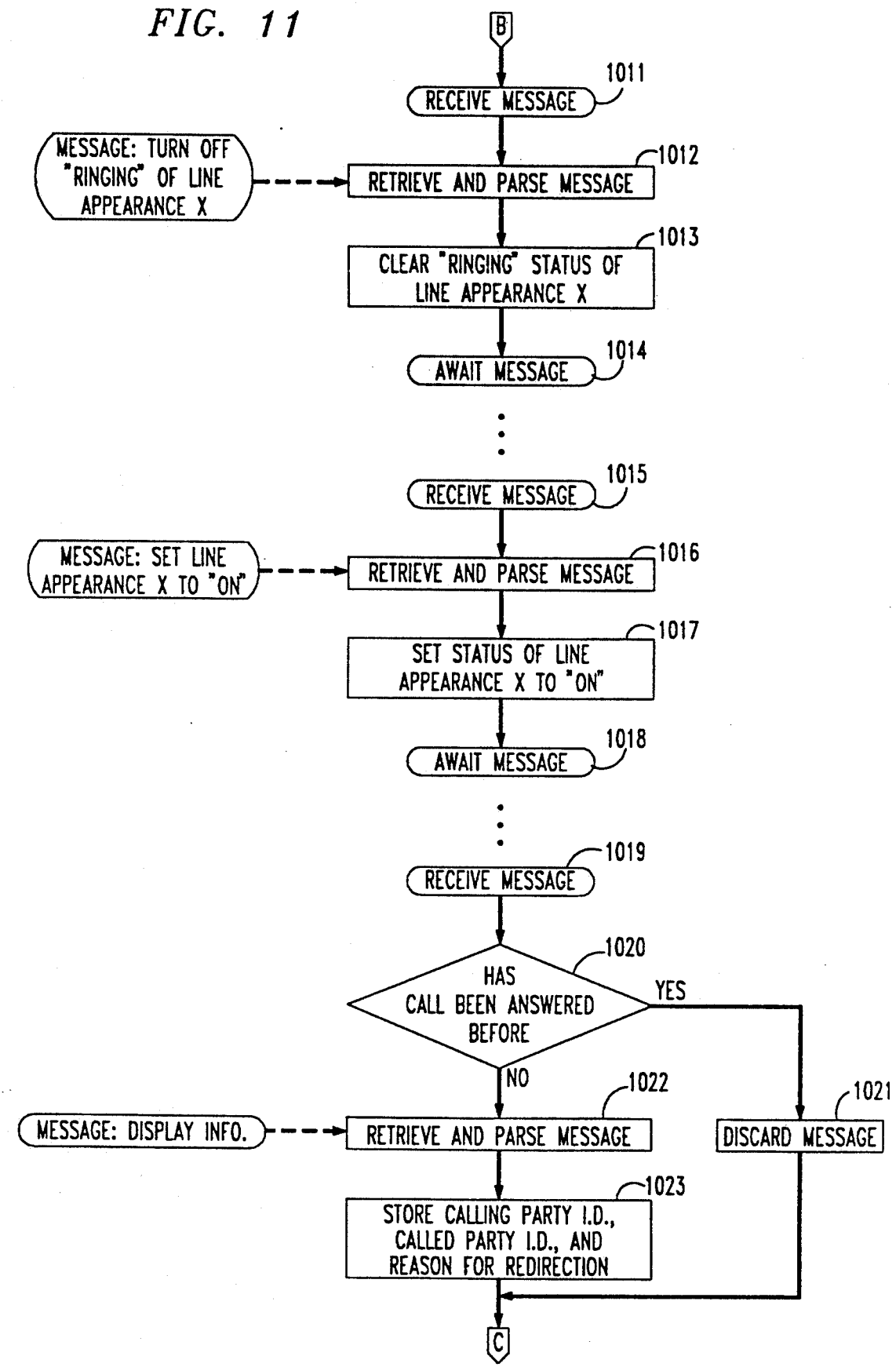
Figure 12:
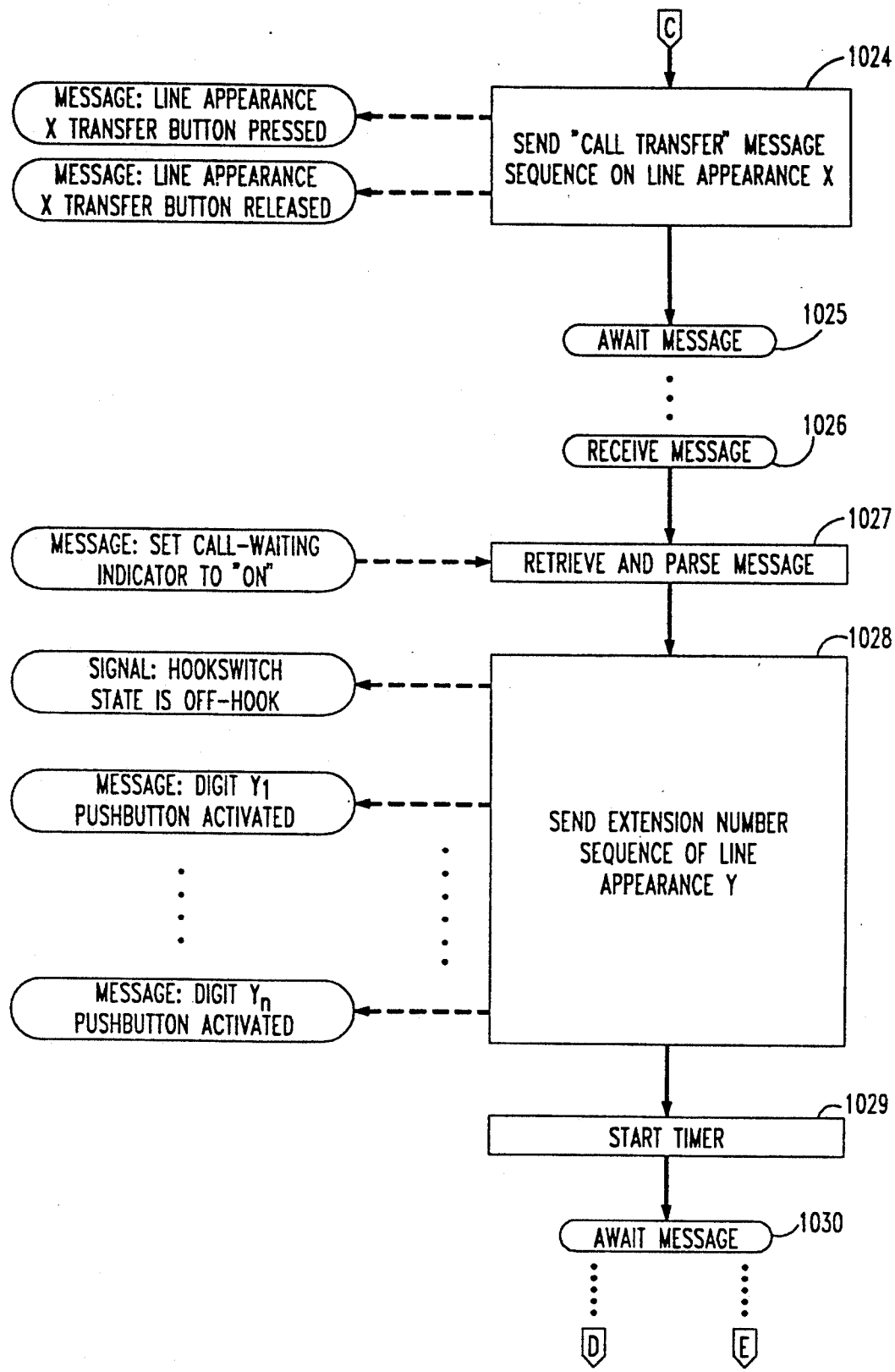
Figure 13:
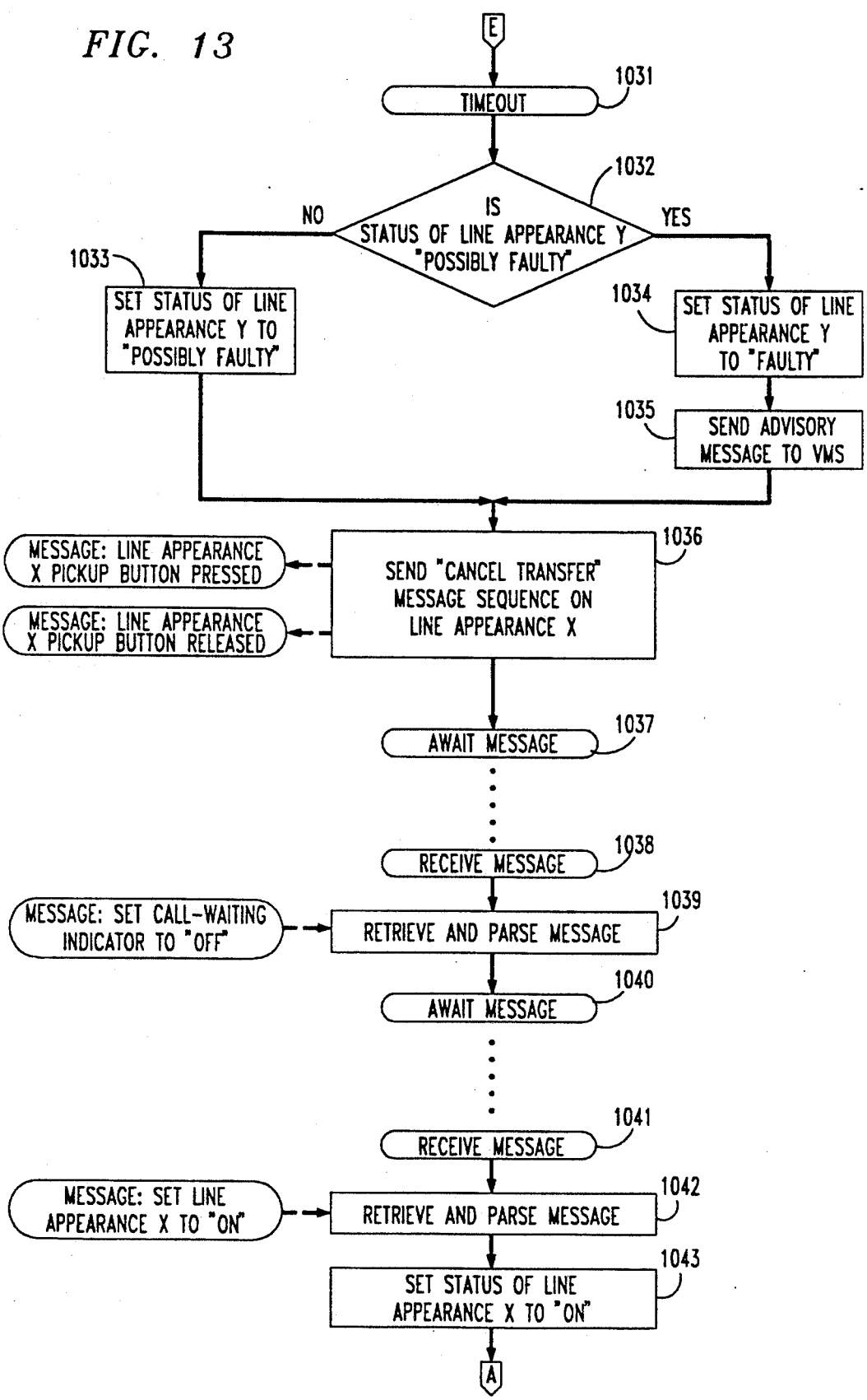
Figure 14:
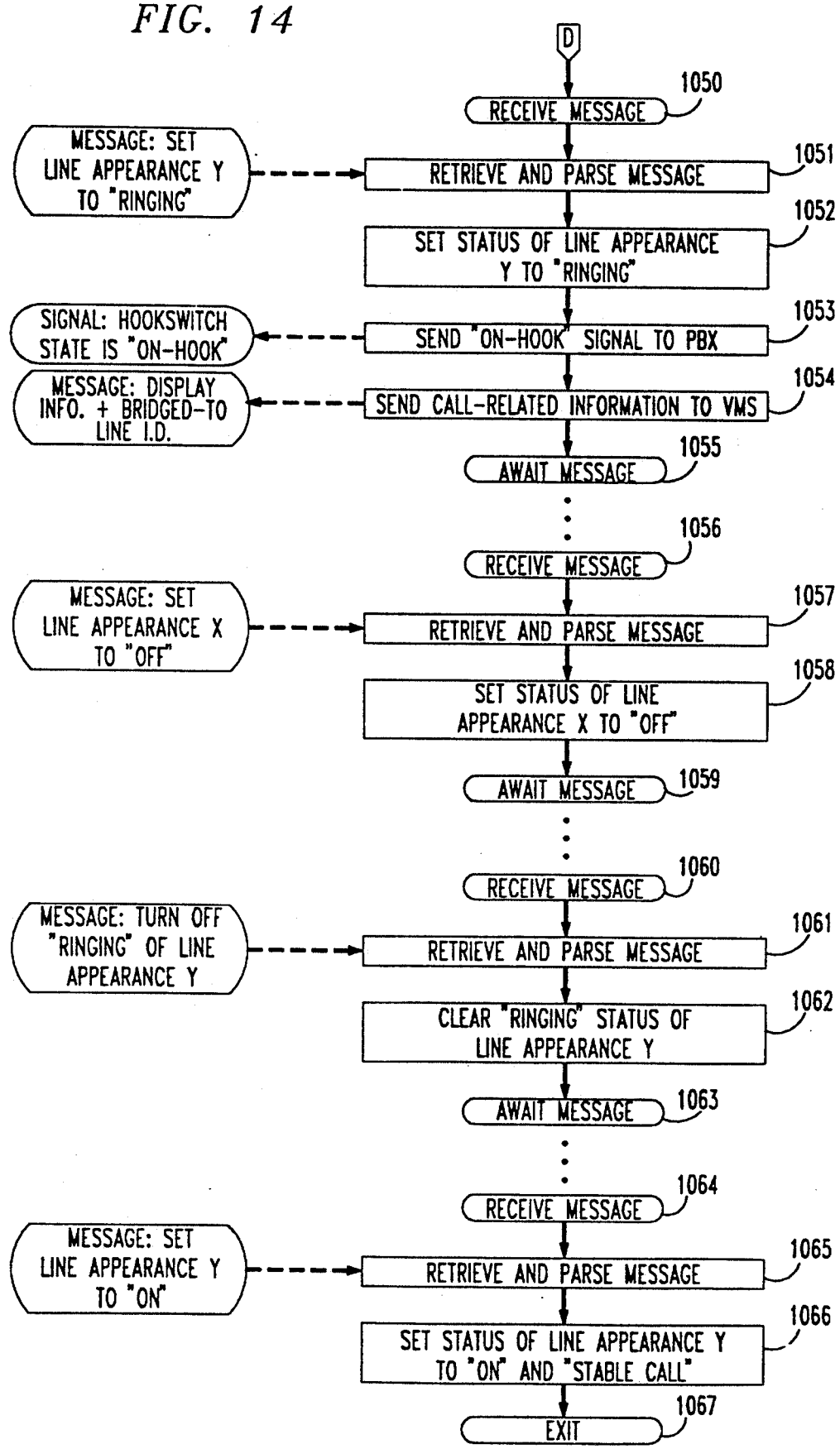

Returning to FIG. 7, if analysis of the retrieved interrupt information at step 703 indicates that a message was sent by sequencer 505 or 506 to circuit 514, routine 700 invokes routine 900 at step 704. Routine 900 is also invoked to initiate transmittal of a message from processor 403 to circuit 514. Routine 900 is shown in FIG. 9. As part of its invocation, at step 901, routine 900 receives information on which shift register 501 or 503 of which interface 405 the message is to be transmitted through, and initially receives information identifying an output buffer 620 in memory 404 that is the source of the message. Routine 900 first checks whether the subject output buffer 620 has a message to transmit, at step 902. If not, routine 900 returns, at step 905; if so, routine 900 uses the information received at its invocation to retrieve a part of the message from buffer 620, at step 903, and transmit it to the appropriate shift register, at step 904. Routine 900 then returns, at step 905.

When an incoming call either directly dials the extension number that is assigned to VMS 12 or is forwarded to the hunt/distribution group of line appearances 21, PBX 10 finds an idle one of the line appearances 21 and sends a message across that line appearance's corresponding line 14 to flash any indicator LED of that line appearance 21 at a "ringing" rate. This message corresponds to "connect" message 300 in FIG. 3. When this complete message is received and stored in memory 404 of SAIL 11, procedure 1000 is invoked at step 806 of FIG. 8.

Procedure 1000 is shown in FIGS. 10-14. As part of its invocation, at step 1001, procedure 1000 receives information identifying the buffer 610 where the message is stored. Procedure 1000 retrieves the message and parses it, at step 1002. Procedure 1000 then accesses status table 600 entry 601 of the corresponding line appearance 21 and updates its status field 603 to "ringing" status, at step 1003. Procedure 1000 then checks the status of bridged line appearances 23 in table 600 to determine if any are idle (having a status of "off"), at step 1004. If not, procedure 1000 goes to sleep waiting for a line appearance 23 to become idle, at step 1005. When procedure 1000 is awakened by a line appearance 23 becoming idel, at step 1006, or upon finding an idle line appearance 23 at step 1004, procedure 1000 changes the status of that bridged line appearance 23 to "reserved" in table 600, at step 1007. Procedure 1000 then causes a sequence of messages—one indicating that the virtual pickup button of the line appearance 21 that was identified at step 1002 has been pressed, and another indicating that the same button has been released—to be sent to PBX 10, at steps 1008 and 1009, respectively. These messages correspond to "answer" message 301 of FIG. 3. The sending of each of these messages involves storing the message in a buffer 620 and invoking execution of routine 900. Procedure 1000 then awaits a response from PBX 10, at step 1010.

In response to receipt of the messages sent at steps 1008 and 1009, PBX 10 engages in conventional call-answered call processing for the subject line appearance 21, and as part thereof sends a series of messages to SAIL 11. One message is to turn off the "ringing" flash rate of any indicator LED of that line appearance 21, a second message is to turn on any indicator LED of that line appearance 21, and a third message is to display call-related information conveyed by this message. These messages correspond to "call info." message 302 of FIG. 3.

Upon receipt of the first message, at step 1011, procedure 1000 retrieves and parses the message, at step 1012. In response to the message, procedure 1000 clears the "ringing" status of the corresponding line appearance 21 in table 600, at step 1013, and then awaits the second message, at step 1014.

Upon receipt of the second message, at step 1015, procedure 1000 retrieves and parses the message, at step 1016. In response to the message, procedure 1000 sets the status of the corresponding line appearance 21 in table 600 to "on", at step 1017, and then awaits the third message, at step 1018.

Upon receipt of the third message, at step 1019, procedure 1000 determines whether this call has been answered before, i.e., whether the third message has already been received for this call previously, at step 1020. If so, procedure 1000 discards the presently-received third message, at step 1021; if not, procedure 1000 retrieves and parses the third message, at step 1022, and stores the call information conveyed by the third message in memory 600 for future use, at step 1023. This information includes called and calling party I.D., and the reason for redirection: forwarded, ring/no answer, busy, or no reason. No reason indicates that the call has not been redirected, i.e., that it is a direct-dialed call. For a direct-dialed call, no called party I.D. is provided.

Following step 1021 or 1023, procedure 1000 causes a sequence of messages—one indicating that the virtual call transfer button of the subject line appearance 21 has been pressed, and another indicating that the same button has been released—to be sent to PBX 10 to initiate transfer of the call from the subject line appearance 21, at step 1024. Procedure 1000 then awaits a response from PBX 10, at step 1025.

In response to the transfer messages sent at step 1024, PBX 10 sends a message to SAIL 11 to turn on any call-waiting indicator LED. Upon receipt of this message, procedure 1000 is re-invoked, at step 1026, and it retrieves and parses the message, at step 1027. This message serves as a confirmation to procedure 1000 that it may proceed with the remainder of the call-transfer cycle, and so procedure 1000 causes a sequence of messages and signals to be sent to PBX 10 which identify the extension number to which the call is to be transferred, at step 1028. First, procedure 1000 causes an "off-hook" signal to be generated on hookswitch state lead 518. Then procedure 1000 causes a series of messages to be sent to PBX 10 which identify virtual digit pushbuttons that are being activated. Each message thus identifies to PBX 10 one digit of the extension number to which the call is to be transferred. The sent extension number identifies the line appearance 23 that was marked as being "reserved" in step 1007. The message and signal sequence of steps 1024–1028 corresponds to "transfer" message 303 of FIG. 3.

Having completed the sequence of step 1028, procedure 1000 starts a 100 ms timer, at step 1029, and awaits a message from PBX 10, at step 1030. If the timer times out before a response message is received from PBX 10, procedure 1000 assumes that the transfer failed. Procedure 1000 therefore accesses entry 601 of table 600 that corresponds to the bridged line appearance 23 and checks status field 603 thereof, at step 1031. If it is marked as "possibly-faulty", procedure 1000 changes it to "faulty", at step 1034, and then causes a message to be sent to VMS 12, at step 1035, to advise it that the bridged line appearance's corresponding line 13 is deemed faulty and should not be used. If the status of the bridged line appearance 23 in table 600 is not marked as "possibly-faulty", procedure 1000 so marks it, at step 1033. Following step 1033 or 1035, procedure 1000 sends a sequence of messages—one indicating that the virtual pickup button of the line appearance 21 from which the call was being transferred has been pressed, and another indicating that the same button has been released—to PBX 10 to cancel the transfer, at step 1036. Procedure 1000 then awaits a response message from PBX 10, at step 1037.

PBX 10 responds to the "cancel transfer" message sequence by sending messages to SAIL 11 to turn off any call-waiting indicator, and to turn on again any indicator of the line appearance 21 from which the call was being transferred. Upon receipt of the first message from PBX 10, at step 1038, procedure 1000 retrieves and parses the message, at step 1039. Procedure 1000 then proceeds to await the next message from PBX 10, at step 1040. Upon receipt thereof, at step 1041, procedure 1000 retrieves and parses the second message, at step 1042. In response to the second message, procedure 1000 sets the status of the subject line appearance 21 to "on" in table 600, at step 1043. Procedure 1000 then returns to step 1004 to attempt another transfer of the call.

Returning to step 1028, PBX 10 interprets the extension number that was sent by SAIL 11 as the extension number of the line 13 to which the corresponding line appearance 23 is bridged. In response, PBX 10 applies ringing signals to the designated line 13, and sends a message across the bridged line appearance 23 to flash the indicator LED of that line appearance 23 at a "ringing" rate. This message corresponds to "connect" message 304 in FIG. 3.

If the "ringing" message is received by procedure 1000 before the timer that was activated at step 1029 times out, procedure 1000 is re-invoked thereby, at step 1050, and it retrieves and parses the message, at step 1051. Procedure 1000 then accesses entry 601 of the subject bridged line appearance 23 in table 600 and marks its status as "ringing", at step 1052. The message indicates to procedure 1000 that the transfer was successful. In response, procedure 1000 sends a signal to PBX 10, at step 1053, that completes the transfer and disassociates—completely disconnects—from the transferred call the line appearance 21 on which the call originally came in to SAIL 11. This signal is an "on-hook" signal generated on hookswitch state lead 518. It corresponds to "disconnect" message 305 of FIG. 3. Procedure 1000 also sends the call-related information that it stored at step 1023, along with information identifying line 13 to which the call is now connected, to VMS 12, at step 1054. This message corresponds to "call info." message 306 of FIG. 3. Procedure 1000 then awaits a response message from PBX 10, at step 1055.

PBX 10 responds to the "on-hook" signal that was sent by SAIL 11 at step 1053 by sending a message to SAIL 11 to turn off any indicator LED associated with the subject line appearance 21. Receipt of the message, at step 1056, causes procedure 1000 to retrieve and parse the message, at step 1057. In response to the message, procedure 1000 sets the status of the subject line appearance 21 to "off" in table 600, at step 1058. Procedure 1000 then awaits a message from PBX 10, at step 1059.

VMS 12 receives the message that was sent 1054, correlates the call-related information contained therein with a ringing one of lines 13, and answers the ringing line 13 in an integrated manner (i.e., in the same manner as if link 17 was able to be used). PBX 10 detects the answer and, in response thereto, engages in conventional call processing to complete connection of the transferred call to that line 13. As part thereof, PBX 10 removes ringing from line 13 and sends a first message to SAIL 11 to cancel the ringing state of any indicator LED of the line appearance 23 that is bridged to that line 13. PBX 10 also cuts-through a connection between the calling party and line 13, and sends a second message to SAIL 11 to turn on any indicator LED of the bridged line appearance 23.

Receipt of the first message re-invokes procedure 1000, at step 1060, and it retrieves and parses the message, at step 1061. In response to the message, procedure 1000 clears the status of the subject bridged line appearance 23 in table 600, at step 1062. Procedure 1000 then awaits the next message from PBX 10, at step 1063.

Upon receipt of the second message, at step 1064, procedure 1000 retrieves and parses the message, at step 1065. In response to the second message, procedure 1000 sets the status of the subject bridged line appearance 23 in table 600 to "on" and "stable", at step 1066. The tasks of procedure 1000 are thus completed, and it exits, at step 1067.

Figure 15:
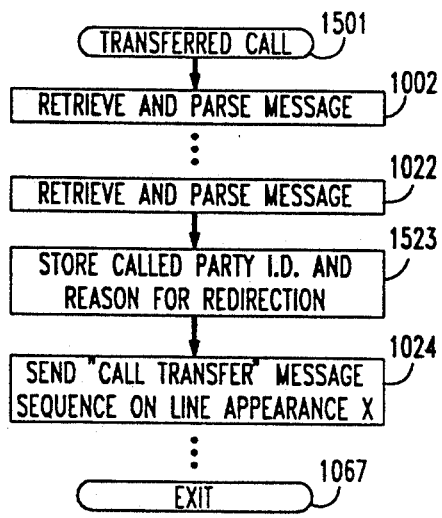
FIG. 15 is a flow diagram of a transferred-call processing procedure of the SAIL of FIG. 1.

A procedure 1500 for handling a transferred call is shown in FIG. 15. It is identical to direct/forwarded call procedure 1000, with the following exceptions: instead of a line appearance 21, procedure 1500 makes use of a line appearance 22; and, at step 1523 corresponding to step 1023 of procedure 1000, procedure 1500 does not store calling party I.D., and stores "transferred" as a reason for redirection.

Figure 16:
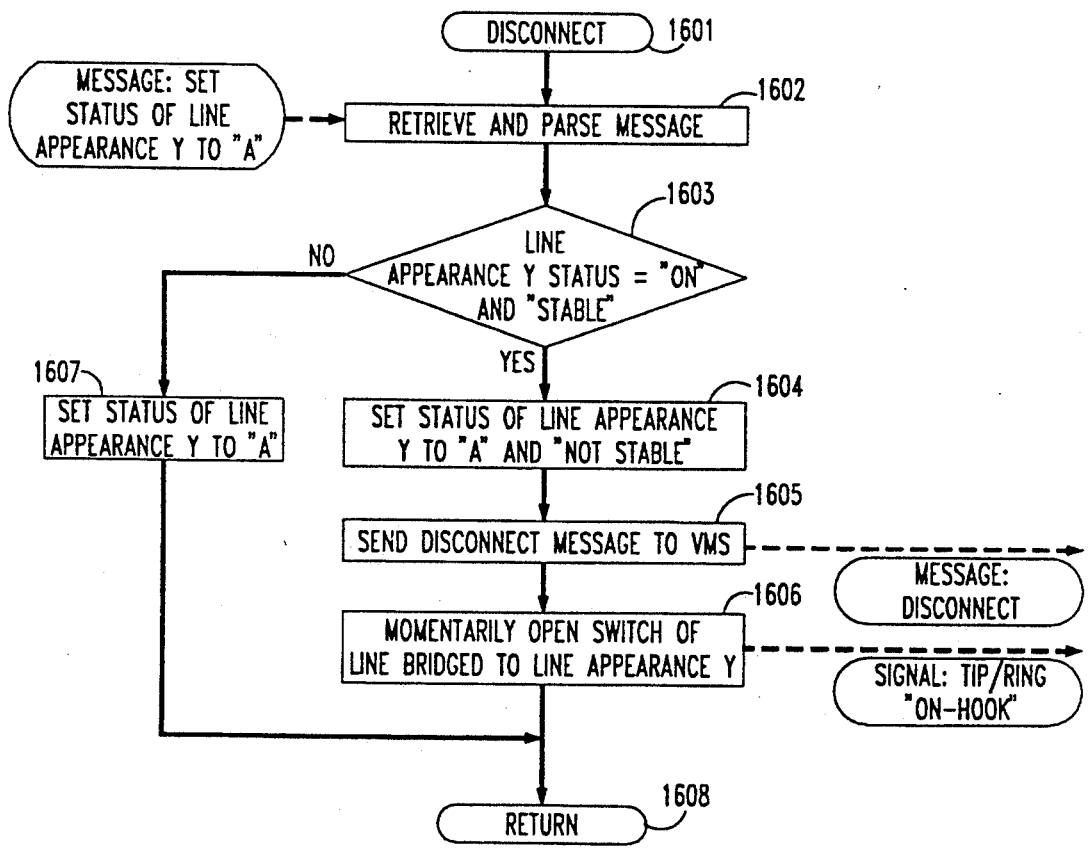
FIG. 16 is a flow diagram of a disconnect routine of the SAIL of FIG. 1.

A routine 1600 for handling call disconnection is shown in FIG. 16. Routine 1600 is executed when a message is received from PBX 10 that seeks to change the status of any indicator of a bridged line appearance 23. Upon its invocation at step 1601, routine 1600 retrieves and parses the received message, at step 1602. In response to the message, routine 1600 checks table 600 entry 601 of the bridged line appearance 23 identified by the received message, to determine if the status is "on" and "stable". If so, routine 1600 interprets the received message as signifying call disconnect and corresponding to "disconnect" message 307 of FIG. 3. Routine 1600 sets the status of the bridged line appearance 23 in table 600 to whatever is specified by the received message (e.g., "on" or "off") and to "not stable", at step 1604. Routine 1600 also causes a disconnect message to be sent via link 15 to VMS 10, at step 1605. This message corresponds to "disconnect" message 308 of FIG. 3. Routine 1600 further causes the one switch 416 that is connected to the line 13 to which the subject line appearance 23 is bridged to be momentarily opened (e.g., for 500 ms), at step 1606. Routine 1600 then returns to the point of its invocation, at step 1608.

The momentary opening of switch 416 generates a tip/ring "on-hook" signal on the connected line 13. Both this signal and the disconnect message sent at step 1605 indicate call completion to VMS 12. VMS 12 generally responds to whichever one it receives and recognizes first, and ignores the other.

Returning to step 1603, if the status of the bridged line appearance 23 is there found to not be "on" and "stable", it indicates that steps 1604-1606 have already been performed and the call has already been disconnected. Routine 1600 therefore merely updates the status of the bridged line appearance 23 in table 600 to whatever is specified by the received message (e.g., "on" or "off"), and retains the "not stable" portion of the status intact, at step 1607. Routine 1600 then returns, at step 1608.

Disconnect routine 1600 shown in FIG. 16 has the advantage that it handles a variety of foreseeable call-completion scenarios, advantageously all in the same manner as if it could interpret a message for disconnect on link 17. For illustration, three such scenarios are presented in FIGS. 17-19.

Figure 17:
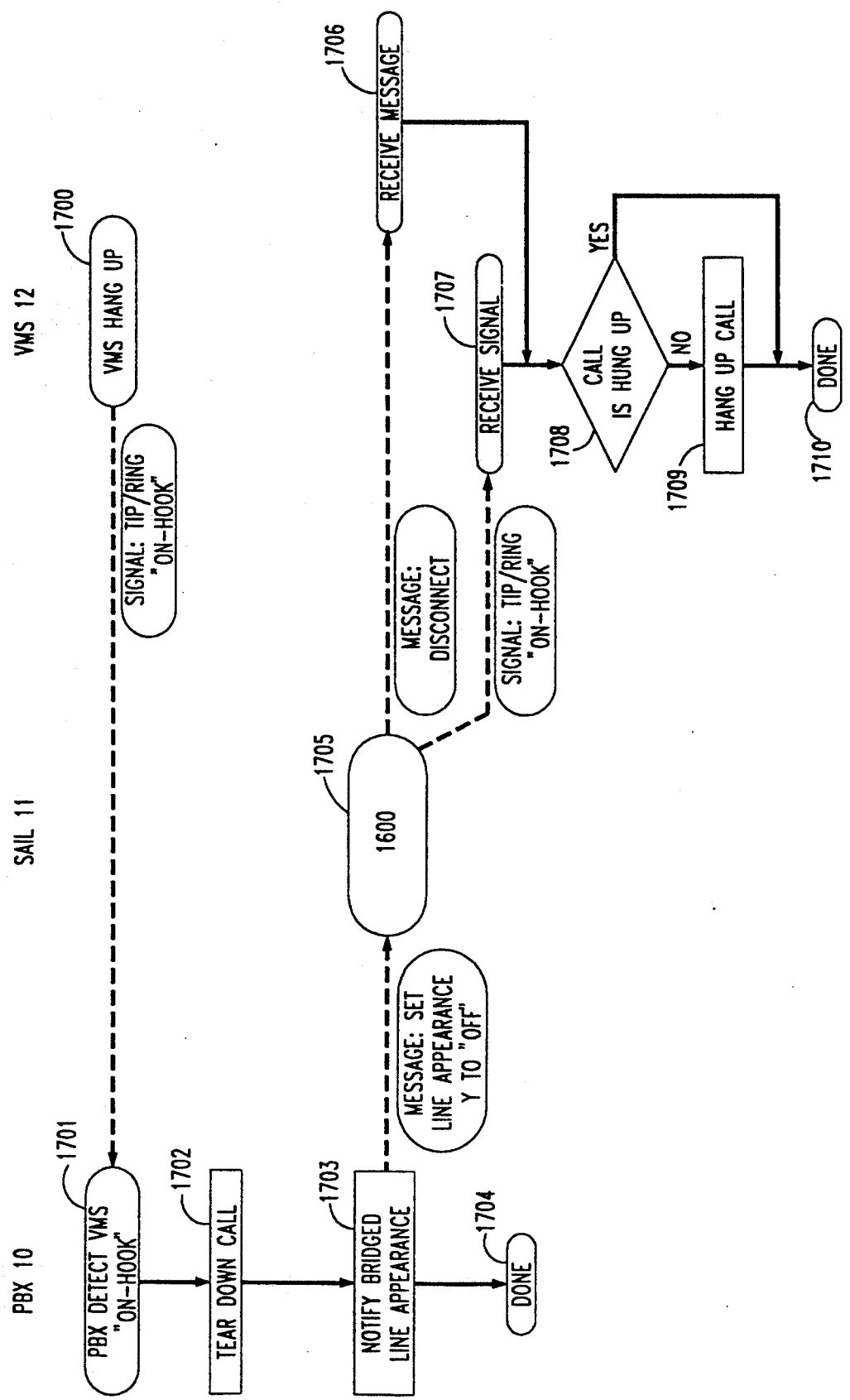

FIG. 17 illustrates the scenario of call-completion initiated by VMS 12. When VMS 12 hangs up, at step 1700, it generates a tip/ring "on-hook" signal on the call's line 13. This signal is detected by PBX 10, at step 1701, which responds by tearing down the call, at step 1702. PBX 10 also sends notification of the call completion to SAIL 11 on line appearance 23 which is bridged to the call's line 13, at step 1703. This notification takes the form of a message to turn off any indicator LED associated with that bridged line appearance 23. PBX 10 is then done with the call, at step 1704.

The message which is sent by PBX 10 at step 1703 triggers execution of disconnect routine 1600 of FIG. 16, at step 1705, resulting in a disconnect message and a tip/ring "on-hook" signal being sent to VMS 12. VMS 12 responds to the receipt of either the message, at step 1706, or the signal, at step 1707, by checking if the call has already been hung up, at step 1708. If not, VMS 12 hangs up the call, at step 1709, and is thereby done with the call, at step 1710. If the call has already been hung up, then VMS 12 is already done with the call at step 1710, and so it just ignores the received message and/or signal.

FIG. 18 illustrates a scenario of call-completion initiated by the calling party. When the calling party hangs up, PBX 10 detects an "on-hook" signal from the calling party, at step 1800. In response, PBX 10 tears down the call, at step 1801, and sends notification of the call completion to SAIL 11 on line appearance 23 which is bridged to the call's line 13, at step 1802. This notification takes the form of a message to turn off any indicator LED associated with that bridged line appearance 23.

The message which is sent by PBX 10 triggers execution of disconnect routine 1600 of FIG. 16, at step 1817, resulting in a disconnect message and a tip/ring "on-hook" signal being sent to VMS 12. VMS 12 responds thereto as described for FIG. 17.

After sending the message at step 1802, PBX 10 starts an, e.g., 2 second, timer, at step 1803, and waits for it to time out, at step 1804. Upon timer timeout, PBX 10 checks whether VMS 12 has sent an "on-hook" signal on the call's line 13, at step 1805. If so, PBX 10 is done with the call, at step 1816; if not, PBX 10 interprets it as an attempt by VMS 12 to originate a call, and so gives a dial tone to VMS 12 on that line 13, at step 1806. The dial tone is treated by VMS 12 as part of the call, and is ignored as a signal, at step 1807.

PBX 10 also sends notification of that giving of that dial tone on line appearance 23 which is bridged to that line 13, at step 1808. The notification takes the form of a message to turn on any indicator LED associated with that bridged line appearance 23. This message triggers execution of disconnect routine 1600 of FIG. 16, at step 1809. Because of prior execution of routine 1600 at step 1817, the message triggers no external response from routine 1600.

After it has given dial tone to VMS 12 and notified SAIL 11 thereof, at steps 1806 and 1808, PBX 10 waits for a response from VMS 12, at step 1810. The response it receives, at step 1811, is the tip/ring "on-hook" signal on line 13 when VMS 12 hangs up the call at step 1709. In response to the "on-hook" signal, PBX 10 removes the dial tone from line 13, at step 1812; VMS 12 ignores this removal, at step 1813. PBX 10 also notifies SAIL 11 of the dial-tone removal from line 13, at step 1814, by sending a message to turn off any indicator LED associated with line appearance 23 that is bridged to line 13. PBX 10 is then done with the call, at step 1816. The message sent by PBX 10 at step 1814 again triggers execution of disconnect routine 1600 of FIG. 16, at step 1815. Because of prior execution of routine 1600 at step 1817, the message again triggers no external response from routine 1600.

Figure 19:
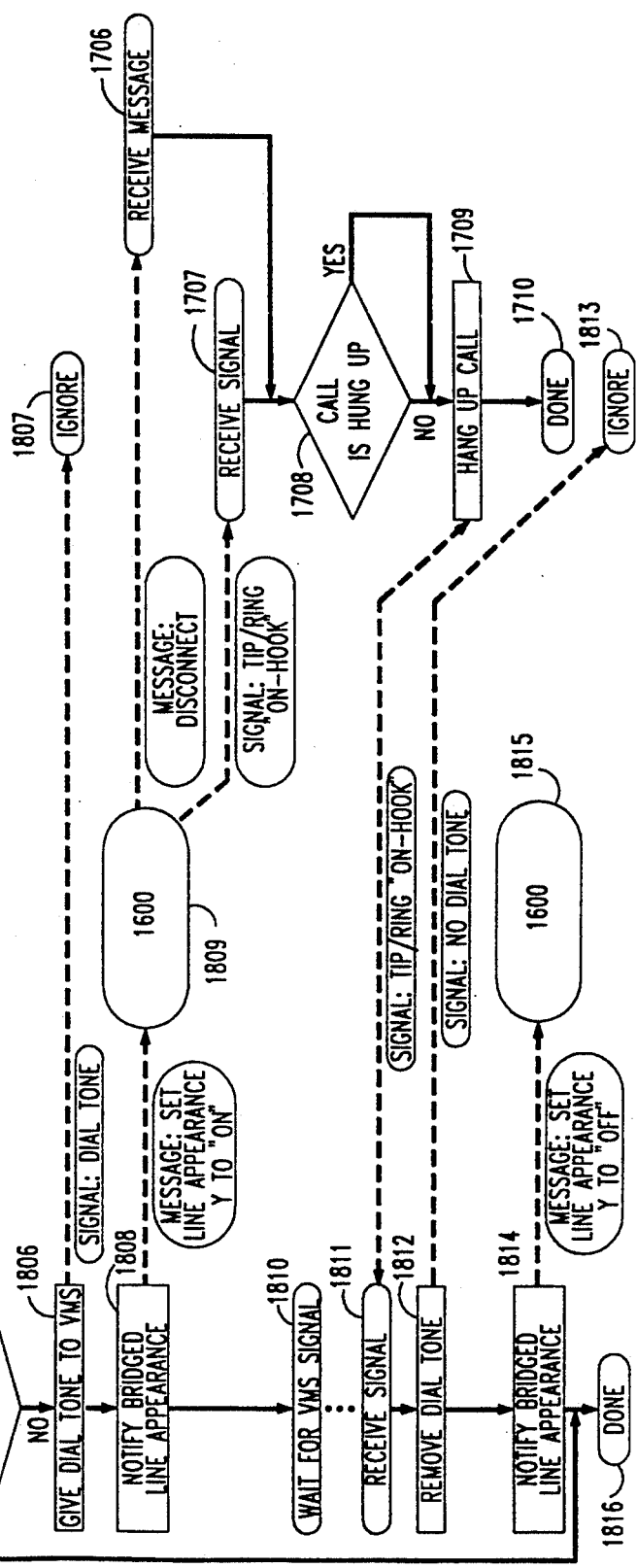

The disconnect scenario shown in FIG. 18 has PBX 10 sending an indicator LED "off"-"on"-"off" message sequence to SAIL 11. The same routine 16 can handle a different message sequence as well: for example, one where PBX 10 does not send the first indicator LED "off" message. This scenario is shown in FIG. 19. In this scenario, step 1802 of PBX 10 is omitted, resulting in omission of execution of routine 1600, step 1817. Instead, execution of routine 1600 at step 1809 becomes the first execution thereof, resulting in the sending of the disconnect message and tip/ring "on-hook" signal to VMS 12. In other respects, the scenarios of FIGS. 18 and 19 are identical.

Figure 20:
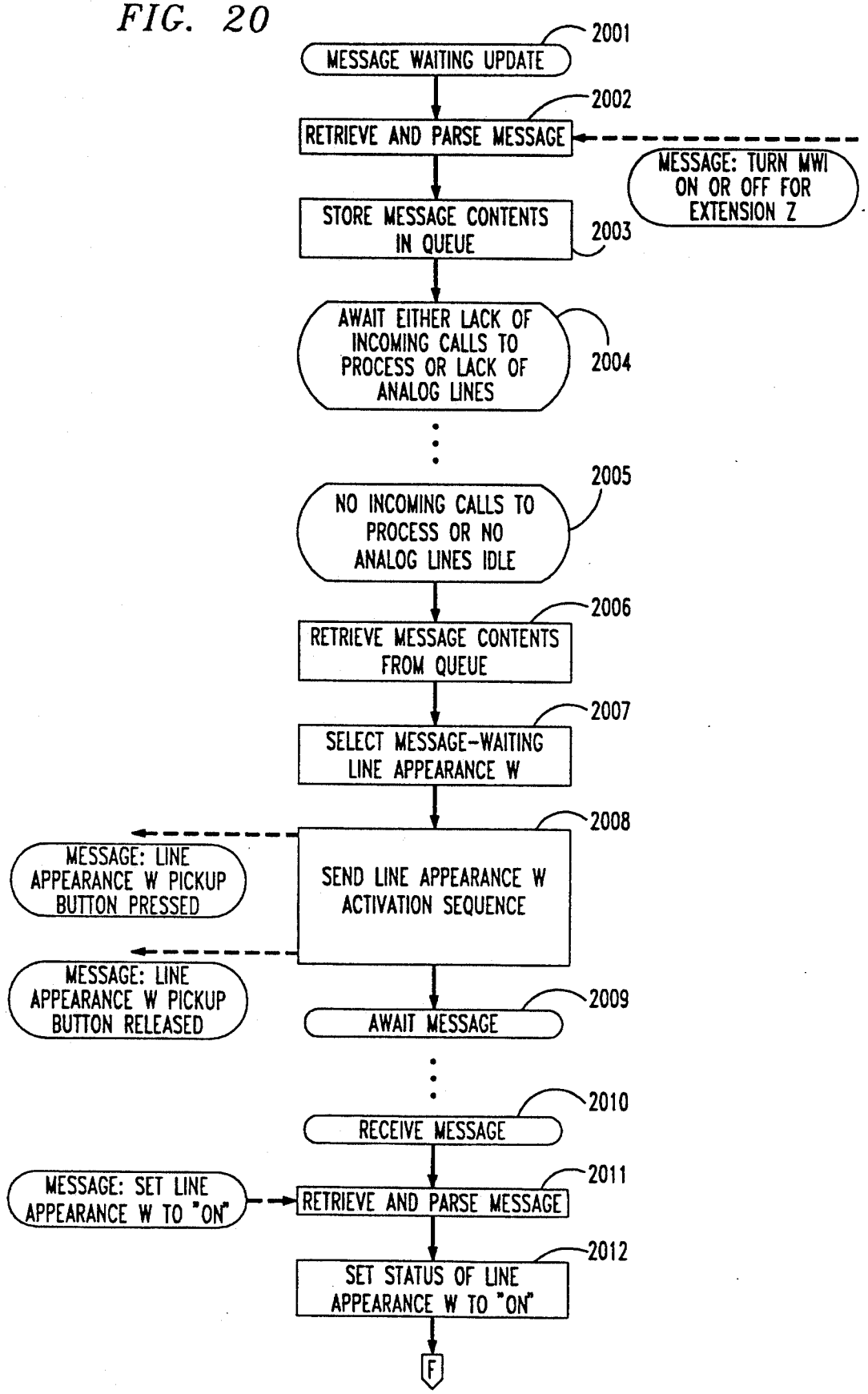
Figure 21:
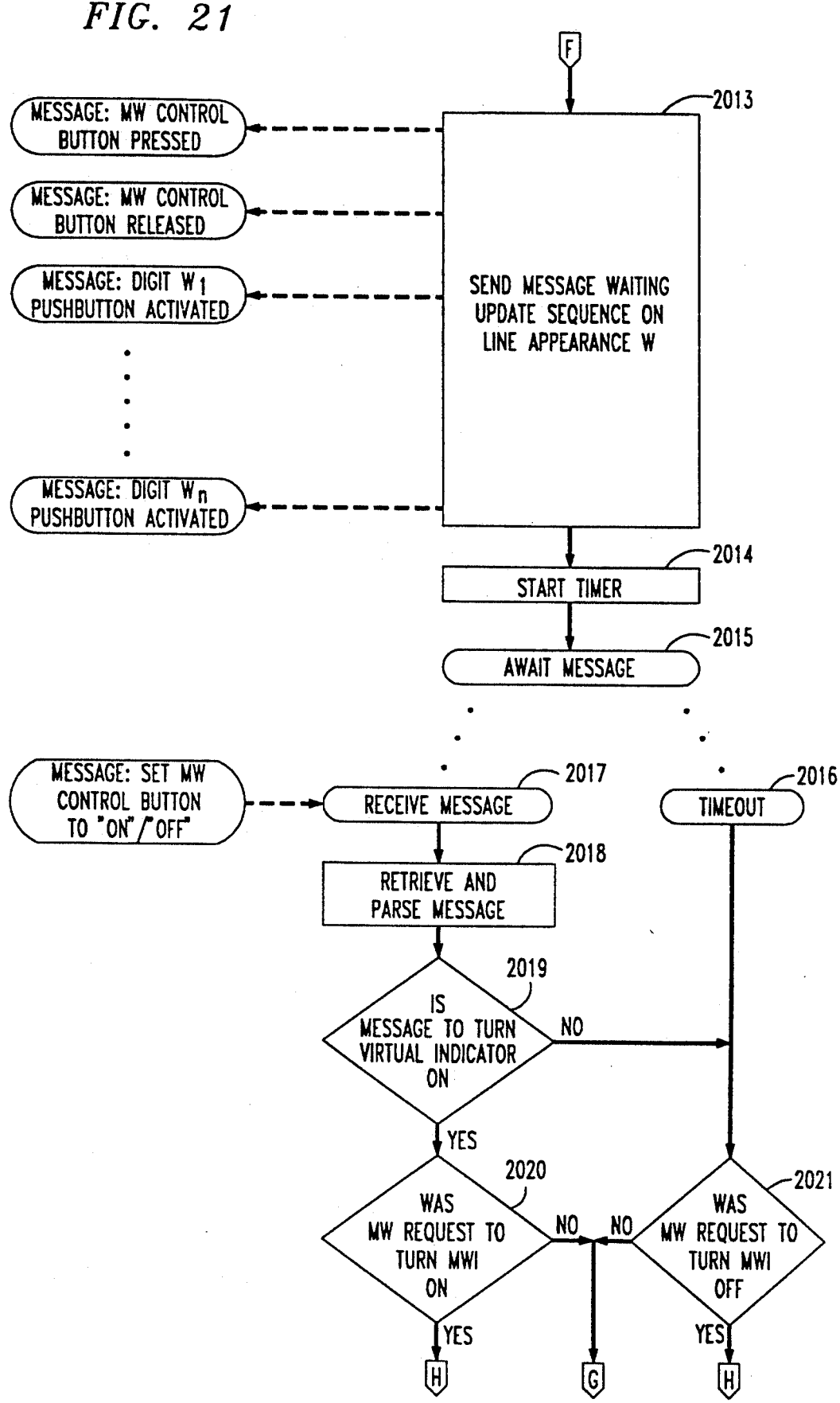

FIGS. 20-22 show a procedure 2000 for updating message-waiting indicators 19 of subscriber telephones 18. Execution of procedure 2000 is triggered by receipt at SAIL 11 of a message from VMS 12 commanding that the message-waiting indicator 19 that is associated with an extension number identified within the message be either turned on or turned off. This message corresponds to "M.W." message 309 of FIG. 3. Upon its invocation, at step 2001, procedure 2000 retrieves the received message from buffer 411 of interface 401 (see FIG. 4) and parses it, at step 2002, and stores the message contents in a queue 630 in memory 404 (see FIG. 6), at step 2003. Updating of message-waiting indicators 19 is a low-priority task, so further processing of the command awaits either lack of incoming calls to be processed by SAIL 11 on one of the lines 14, or lack of any idle lines 13, at step 2004. When there are no calls incoming from PBX 10 that remain to be processed by SAIL 11 on one of the lines 14, or there are no idle lines 13 available, at step 2005, procedure 2000 retrieves the contents of a message-waiting update message from queue 630, at step 2006. Procedure 2000 then selects line appearance 24 of the idle one of the lines 14, or of either line 14 in the case of no idle lines 13, at step 2007, and causes a line-appearance-activation message sequence for the selected line appearance 24 to be sent to PBX 10, at step 2008. The sequence comprises a message indicating that a virtual pickup button associated with the selected line appearance 24 has been pressed, followed by a message indicating the same virtual button to have been released. Procedure 2000 then awaits a response from PBX 10, at step 2009.

In response to receipt of the line-appearance-activation message sequence sent at step 2008, PBX 10 sends a message to SAIL 11 to turn on any indicator LED associated with the activated line appearance 24. Receipt of this message re-invokes procedure 2000, at step 2010, and it responds by retrieving and parsing the message, at step 2011. Procedure 2000 then accesses entry 601 of the subject line appearance 24 in table 600 and sets its status to "on", at step 2012. Procedure 2000 then causes a message-waiting-update message sequence to be sent to PBX 10 on the subject line appearance 24, at step 2013. Routine 2000 then starts a timer, at step 2014, and awaits a message from PBX 10, at step 2015.

The sequence of messages sent at step 2013 comprises a message indicating that a message-waiting control virtual pickup button has been pressed, followed by a message indicating the same virtual button to have been released, followed by a series of messages which identify virtual digit pushbuttons that are being activated. Each one of the latter messages thus identifies to PBX 10 one digit of the extension number whose associated message-waiting indicator 19 is to be controlled. The sequence of messages considered at steps 2008-2013 correspond to "M.W." message 310 of FIG. 3.

Having received the messages sent at step 2013, PBX 10 looks up the state of the message-waiting indicator 19 of the designated extension number. If indicator 19 is on, PBX 10 sends to SAIL 11 a message to turn on any indicator LED associated with the message-waiting control button; if indicator 19 is off, PBX 10 either sends no message to SAIL 11 or sends a message to turn off any indicator LED associated with the message-waiting button. This message or absence of message corresponds to "M.W. status" message 311 of FIG. 3.

In the meantime, procedure 2000 awaits any message sent by PBX 10, at step 2015. If the timer started at step 2014 expires before a message is received from PBX 10, at step 2016, procedure 2000 treats it the same as if it had received a message to turn off any indicator LED associated with the message-waiting button. If a message is received before expiration of the timer, at step 2017, procedure 2000 retrieves and parses the message, at step 2018, to determine if the message is to turn on any indicator LED associated with a message-waiting button, at step 2019. If so, procedure 2000 checks whether the request from VMS 12 was to turn on a message-waiting indicator 19, at step 2020; if not, procedure 2000 checks whether the request from VMS 12 was to turn off a message-waiting indicator 19, at step 2021. If the VMS request does match the state of the virtual message-waiting button's virtual indicator LED, procedure 2000 continues at step 2026; if not, procedure 2000 causes a message-waiting indicator toggle message sequence to be sent to PBX 10, at step 2022. The sequence comprises a message indicating that the message-waiting virtual button has been pressed, followed by a message indicating the same virtual button to have been released. This message sequence corresponds to "toggle" message 312 of FIG. 3.

In response to receipt of the message sequence sent at step 2022, PBX 10 changes the state of the subject M.W. indicator 19, and sends a message to SAIL 11 to toggle the state of any indicator LED of any message-waiting button. This message is awaited by procedure 2000, at step 2023. Upon receipt of the message, at step 2024, procedure 2000 discards it, at step 2025, and continues at step 2026.

Following steps 2020, 2021, or 2025, procedure 2000 causes a sequence of messages, duplicating the sequence sent at step 2008, to be sent to PBX 10 to deactivate the message-waiting line appearance 24, at step 2026. This message sequence corresponds to "disconnect" message 313 of FIG. 3. Procedure 2000 then awaits a response message from PBX 10, at step 2027. PBX 10 responds with a message to turn off any indicator LED associated with that line appearance 24. Upon receipt of the message by SAIL 11. at step 2028. procedure 2000 retrieves and parses the message, at step 2029. Procedure 2000 then accesses entry 601 of the subject line appearance 24 in table 600 and sets its status to "off", at step 2030. Its task is thus completed, and procedure 2000 exits, at step 2031.

Of course, it should be understood that various changes and modifications may be made to the above-described illustrative embodiments of the invention. For example, the relay switches may be eliminated from the SAIL and the analog lines may be connected directly between the PBX and the VMS. Or, a different number of digital lines—fewer than or more than 2—may interconnect the PBX and the SAIL. Also, different sequences of virtual button activations and deactivations may be used in communications, particularly message-waiting indicator control communications, between the PBX and the SAIL. Furthermore, the implementation of the indicator can take various forms, such as a visual indicator, a stutter dial tone or some other audio indicator, or a textual message to a companion device. In alternative implementations, the distinction between direct/forwarded calls and transferred calls may be eliminated, and consequently the same line appearances may be used for both types of calls. Furthermore, different hardware configurations from that shown herein may be used to implement the functionality of the SAIL. Or, a different adjunct processor may be substituted for the VMS, with corresponding changes being made to the functionality of the SAIL. Such changes and modifications may be made without departing from the spirit and the scope of the invention. It is therefore intended that such changes and modifications be covered by the following claims.

We claim:

1. An arrangement for integrating a telecommunications switching system connected to one or more first telecommunications lines, with an adjunct processor connected to the system by one or more second telecommunications lines each for having calls established and completed thereon, wherein each first line has a plurality of line appearances and a different one of the line appearances is bridged to each second line, the arrangement comprising:

receiving means for connecting to the one or more first lines each one of which has a plurality of line appearances including line appearances bridged to second lines, to receive communications thereon;

communicating means for communicating with the adjunct processor; and communication causing means connected to the receiving and communicating means and responsive to receipt by the receiving means of a first communication for a bridged individual one of the line appearances which first communication signifies completion of a call, for causing the communicating means to communicate to the adjunct processor that a call has been completed on a second line to which the individual one of the line appearances is bridged.

2. The arrangement of claim 1 wherein:
the communicating means comprise
means connecting to the second lines to transmit signals thereon; and
the communication causing means comprise
means responsive to the receipt by the receiving means of the first communication, for transmitting on the second line to which the individual one of the line appearances is bridged a signal communicating to the adjunct processor that a call has been completed on the second line to which the individual one of the line appearances is bridged.

3. The arrangement of claim 1 wherein the adjunct processor is further connected to a control communications link, wherein:
the communicating means comprise
means for connecting to the control link to transmit control communications thereon; and
the communication causing means comprise
means responsive to the receipt by the receiving means of the first communication, for transmitting on the control link a control communication indicating that a call has been completed on the second line to which the individual one of the line appearances is bridged.

4. The arrangement of claim 3 further comprising generating means connected to the second lines for generating call-completion signals on individual ones of the one or more second lines; and wherein the communication causing means further comprise
signal generation causing means responsive to the receipt by the receiving means of the first communication, for causing the generating means to generate a call-completion signal on the second line to which the individual one of the line appearances is bridged.

5. The arrangement of claim 4 wherein:
the generating means comprise one or more connection-breaking switches, a different one switch connected in series with each second line for selectively breaking a connection formed between the system and the adjunct processor by the second line; and
the signal generation causing means respond to the receipt by the receiving means of the first communication by causing the connection-breaking switch that is connected to the second line to which the individual one of the line appearances is bridged to momentarily break the connection formed by that second line.

6. The arrangement of claim 1 further comprising:
call transfer causing means connected to the receiving and the communicating means and responsive to receipt by the receiving means of a second communication for a non-bridged one of the line appearances, the second communication signifying connection of a call to one of the one or more first lines and conveying call-related information for the call, for causing the call to be transferred to one of the one or more second lines and causing the communicating means to communicate to the adjunct processor the call-related information.

7. The arrangement of claim 6 for integrating the adjunct processor with the telecommunications switching system that is further connected to a plurality of telecommunications stations each having a selectively-activatable message-waiting indicator, wherein
the receiving means are for connecting to the one or more first lines to receive and transmit communications thereon; and
the arrangement further comprising
transmission causing means connected to the receiving and communicating means and responsive to receipt by the communicating means of a request to activate the message-waiting indicator of an individual one of the telecommunications stations, for causing the receiving means to transmit on one of the one or more first lines a third communication conveying the received request.

8. The arrangement of claim 1 wherein the adjunct processor is further connected to a control communications link, wherein
the receiving means are for connecting to the one or more first lines to receive and transmit communications thereon, and
the communicating means comprise
means for connecting to the control link to transmit control communications thereon; and
the arrangement further comprising
transmission causing means connected to the receiving means and responsive to receipt by the receiving means of a second communication for a non-bridged one of the line appearances, the second communication signifying connection of a call to one of the one or more first lines and conveying call-related information for the call, for causing the receiving means to transmit a third communication for the non-bridged one of the line appearances, the third communication requesting transfer of the call to one of the one or more second lines, and control means, connected to the communicating means and responsive to the requested transfer of the call, for transmitting on the control link a control communication indicating that the call is connected to the one of the one or more second lines and conveying the call-related information for the call.

9. The arrangement of claim 8 for integrating the adjunct processor with the telecommunications switching system that is further connected to a plurality of telecommunications stations each having a selectively-activatable message-waiting indicator, wherein the communicating means are for connecting to the control link to transmit and receive control communications thereon; and the arrangement further comprising transmission causing means connected to the receiving and communicating means and responsive to receipt by the communicating means of a control communication requesting activation of message-waiting indicator of an individual one of the telecommunications stations, for causing the receiving means to transmit a fourth communication for a non-bridged one of the line appearances, the fourth communication conveying the received request.

10. The arrangement of claim 1 wherein:
each first line is a digital telephone line; and
the first communication is a message of a kind sent by the switching system to a digital telephone upon detection by the switching system of completion of a call.

11. The arrangement of claims 10 wherein:
the message comprises a line appearance indicator light control command.

12. A communications arrangement comprising:
a telecommunications switching system;
an adjunct processor;
one or more second telecommunications lines each for having calls established and completed thereon, connecting the adjunct processor with the switching system;
one or more first telecommunications lines connected to the switching system, each first line having a plurality of line appearances and a different one of the line appearances being bridged to each second line; and
an integrating arrangement connected to the one or more first lines and to the adjunct processor and having means responsive to receipt on a first line of a first communication for a bridged individual one of which line appearances, the first communication signifies completion of a call, for communicating to the adjunct processor that a call has been completed on a second line to which the individual one of the line appearances is bridged.

13. The communications arrangement of claim 12 wherein:
the integrating arrangement further includes means connecting the integrating arrangement to the one or more second lines to transmit signals thereon; and the means for communicating to the adjunct processor are responsive to the receipt on the first line of the first communication, for transmitting on the second line to which the individual one of the line appearances is bridged a signal communicating that a call has been completed on the second line to which the individual one of the line appearances is bridged.

14. The communications arrangement of claim 12 further including a control communications link connecting the integrating arrangement with the adjunct processor; wherein the means for communicating to the adjunct processor are responsive to the receipt on the first line of the first communication, for transmitting on the control link a control communication indicating that a call has been completed on the second line to which the individual one of the line appearances is bridged.

15. The communications arrangement of claim 14 wherein the integrating arrangement further includes means connected to the one or more second lines for generating call-completion signals on individual ones of the one or more second lines; and the communicating means include means responsive to the receipt on the first line of the first communication, for causing the generating means to generate a call-completion signal on the second line to which the individual one of the line appearances is bridged.

16. The communications arrangement of claim 15 wherein:

the generating means comprise one or more switches, a different one switch connected in series with each second line for selectively breaking a connection formed between the switching system and the adjunct processor by the second line; and the causing means respond to the receipt on the first line of the first communication by causing the switch that is connected to the second line to which the individual one of the line appearances is bridged to momentarily break the connection formed by that second line.

17. The communications arrangement of claim 12 wherein:

the integrating arrangement further includes means responsive to receipt on a first line of a second communication for a non-bridged one of the line appearances, the second communication signifying connection of a call to one of the one or more first lines and conveying call-related information for the call, for causing the call to be transferred to one of the one or more second lines and communicating to the adjunct processor the call-related information.

18. The communications arrangement of claim 17 further comprising a plurality of telecommunications stations connected to the switching system and each having a selectively-activatable message-waiting indicator; wherein the integrating arrangement further includes means responsive to receipt from the adjunct processor of a request to activate the message-waiting indicator of an individual one of the telecommunications stations, for transmitting on one of the one or more first lines a third communication conveying the received request.

19. The communications arrangement of claim 12 further including
a control communications link connecting the integrating arrangement with the adjunct processor; wherein
the integrating arrangement comprises
means responsive to receipt on a first line of a second communication for a non-bridged one of the line appearances, the second communication signifying connection of a call to one of the one or more first lines and conveying call-related information for the call, for transmitting on a first line a third communication for the non-bridged one of the line appearances, the third communication requesting transfer of the call to one of the one or more second lines, and
means responsive to the requested transfer of the call, for transmitting on the control link a control communication indicating that the call is connected to the one of the one or more second lines and conveying the call-related information for the call.

20. The communications arrangement of claim 19 further comprising
a plurality of telecommunications stations connected to the switching system and each having a selectively-activatable message-waiting indicator; wherein
the integrating arrangement further includes
means responsive to receipt on the control communications link of a control communication requesting activation of the message-waiting indicator of an individual one of the telecommunications stations, for transmitting on one of the one or more first lines a fourth communication for a non-bridged one of the line appearances, the fourth communication conveying the received request.

21. The arrangement of claim 12 wherein:
each first line is a digital telephone line; and
the first communication is a message of a kind sent by the switching system to a digital telephone upon detection by the switching system of completion of a call.

22. The arrangement of claim 21 wherein:
the message comprises a line appearance indicator light control command.

23. An arrangement for integrating a telecommunications switching system connected to one or more first telecommunications lines, with an adjunct processor connected to a control communications link and connected to the switching system by one or more second telecommunications lines each for having calls established and completed thereon, wherein each first line has a plurality of line appearances and a different one of the line appearances is bridged to each second line, the arrangement comprising:
first interface means for connecting to the one or more first lines each one of which has a plurality of line appearances including line appearances bridged to second lines, to receive and transmit messages on the first lines;
second interface means for connecting to the control communications link to receive and transmit messages on the control communications link;
means responsive to connection by the switching system of a call to a non-bridged one of the line appearances of the one or more first lines, for prompting the switching system, by transmitting a message on the non-bridged one of the line appearances through the first interface means, to send to the arrangement a message containing information describing the call;
means responsive to receipt on the non-bridged one of the line appearances through the first interface means of the message containing the information describing the call, for prompting the switching system, by transmitting a message on the non-bridged one of the line appearances through the first interface means, to transfer the call to a selected one of the one or more second lines, and for transmitting a message containing the received information describing the call and information identifying the selected one of the one or more second lines to the adjunct processor on the control communications link through the second interface means; and
means responsive to receipt through the first interface means on the one of the line appearances that is bridged to the selected one of the one or more second lines of a message signifying call completion, for transmitting a message signifying call completion on the selected one of the one or more second lines to the adjunct processor on the control communications link through the second interface.

24. The arrangement of claim 23 further comprising:
one or more switching means, a different one connected into each second line for selectively breaking the connection between the switching system and the adjunct processor formed by the second line; and
means responsive to the receipt through the first interface means on the one of the line appearances that is bridged to the selected one of the one or more second lines of the message signifying the call completion, for causing the one of the one or more switching means which is connected into the selected one of the one or more second lines to momentarily break the connection.

25. The arrangement of claim 23 wherein:
each first line is a digital telephone line; and
the first communication is a message of a kind sent by the switching system to a digital telephone upon detection by the switching system of completion of a call.

26. The arrangement of claim 25 wherein:
the message comprises a line appearance indicator light control command.

* * * * *